US012463779B2

(12) United States Patent
Manolakos et al.

(10) Patent No.: US 12,463,779 B2
(45) Date of Patent: Nov. 4, 2025

(54) POSITIONING REFERENCE SIGNAL (PRS) SECURITIZATION IN USER EQUIPMENT (UE) POSITIONING

(71) Applicant: QUALCOMM Incorporated, San Diego, CA (US)

(72) Inventors: Alexandros Manolakos, Escondido, CA (US); Weimin Duan, San Diego, CA (US); Soo Bum Lee, San Diego, CA (US); Aziz Gholmieh, Del Mar, CA (US); Gavin Bernard Horn, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 256 days.

(21) Appl. No.: 18/264,832

(22) PCT Filed: Jan. 26, 2022

(86) PCT No.: PCT/US2022/070365
§ 371 (c)(1),
(2) Date: Aug. 9, 2023

(87) PCT Pub. No.: WO2022/217167
PCT Pub. Date: Oct. 13, 2022

(65) Prior Publication Data
US 2024/0063974 A1 Feb. 22, 2024

(30) Foreign Application Priority Data

Apr. 7, 2021 (GR) .............................. 20210100238

(51) Int. Cl.
*H04L 5/00* (2006.01)
(52) U.S. Cl.
CPC .......... *H04L 5/0051* (2013.01); *H04L 5/0007* (2013.01); *H04L 5/0053* (2013.01)

(58) Field of Classification Search
None
See application file for complete search history.

(56) References Cited

U.S. PATENT DOCUMENTS 10,313,838 B2 * 6/2019 Sampath ................. H04W 8/22
11,758,538 B2 * 9/2023 Takeda .................. H04L 5/0053
370/329

(Continued)

FOREIGN PATENT DOCUMENTS

CN 112162301 A 1/2021
EP 3379295 A1 9/2018
(Continued)

OTHER PUBLICATIONS

Taiwan Search Report—TW111103672—TIPO—May 10, 2025.
International Search Report and Written Opinion—PCT/US2022/070365—ISA/EPO—May 13, 2022.

*Primary Examiner* — Diane L Lo
(74) *Attorney, Agent, or Firm* — Weaver Austin Villeneuve & Sampson LLP

(57) ABSTRACT

Reference signals used in location estimation of a user equipment (UE) in a wireless data network can be secured against a man-in-the-middle attack by a transmitting device withholding the conveyance of transmission parameters for decoding portions of a reference signal until after the portions are transmitted. Thus, receiving devices can buffer received signals and, after receiving the transmission parameters, process the buffered signals. To further prevent an attacker device from attacking future reference signals, transmission parameters can be nondeterministic such that an attacker device obtaining a parameter at a certain period of time is unable to use the decoded parameter predict or determine subsequent transmission parameters.

44 Claims, 17 Drawing Sheets

(56) References Cited

U.S. PATENT DOCUMENTS

| | | |
|---|---|---|
| 2013/0301452 A1* | 11/2013 | Yoon .................. H04L 5/0048 370/252 |
| 2014/0171111 A1 | 6/2014 | Xiao et al. |
| 2018/0007576 A1 | 1/2018 | Lee et al. |
| 2018/0048444 A1 | 2/2018 | Park et al. |
| 2018/0139763 A1 | 5/2018 | Bitra et al. |
| 2019/0319827 A1 | 10/2019 | Opshaug et al. |
| 2019/0372818 A1 | 12/2019 | Williams et al. |
| 2022/0099842 A1 | 3/2022 | Cao et al. |
| 2024/0104202 A1 | 3/2024 | Duan et al. |

FOREIGN PATENT DOCUMENTS

| | | |
|---|---|---|
| TW | 202033028 A | 9/2020 |
| WO | WO-2020001533 A1 | 1/2020 |
| WO | 2020167057 A1 | 8/2020 |

* cited by examiner

POSITIONING REFERENCE SIGNAL (PRS) SECURITIZATION IN USER EQUIPMENT (UE) POSITIONING

RELATED APPLICATIONS

This application is a National Phase entry of International Application No. PCT/US2022/070365, filed Jan. 26, 2022, entitled "POSITIONING REFERENCE SIGNAL (PRS) SECURITIZATION IN USER EQUIPMENT (UE) POSITIONING" which claims the benefit of Greek application No. 20210100238, filed Apr. 7, 2021, entitled "POSITIONING REFERENCE SIGNAL (PRS) SECURITIZATION IN USER EQUIPMENT (UE) POSITIONING", both of which are assigned to the assignee hereof, and incorporated herein in their entirety by reference.

BACKGROUND

1. Field of Invention

The present invention relates generally to the field of wireless communications, and more specifically to determining the location of a User Equipment (UE) using radio frequency (RF) signals.

2. Description of Related Art

In a wireless communication network such as a 5th Generation (5G) New Radio (NR) or other cellular network, a location estimation of a user equipment (UE) (a mobile device within the network) may be determined by the UE transmitting and/or measuring reference signals. Although these reference signals are encoded, they may be vulnerable to a man-in-the-middle attacker that decodes a first portion of a reference signal and mimics a subsequent portion or repetition of the reference signal. Such attacks can decrease the accuracy of the location estimation, which can reduce the value of providing location estimation itself.

BRIEF SUMMARY

Embodiments herein address these and other issues by preventing such attacks by withholding the conveyance of transmission parameters for decoding portions of a reference signal until after the portions are transmitted. Thus, receiving devices can buffer received signals and, after receiving the transmission parameters, process the buffered signals. To further prevent an attacker device from attacking future reference signals, transmission parameters can be nondeterministic such that an attacker device obtaining a parameter at a certain period of time is unable to use the decoded parameter predict or determine subsequent transmission parameters.

An example method of securing Positioning Reference Signals (PRS) resources for positioning of a user equipment (UE) in a wireless communication network, according to this disclosure, includes sending, to the UE, first configuration data indicative of a period of time during which at least a portion of a PRS resource is to be transmitted using one or more Orthogonal Frequency Division Multiplexing (OFDM) symbols. Sending the first configuration data occurs prior to transmission of the portion of the PRS resource by a Transmission and Reception Point (TRP) of the wireless communication network, and the first configuration data excludes at least one transmission parameter value for generating a waveform for each of the one or more OFDM symbols. The method further comprises sending, to the UE, second configuration data indicative of the at least one transmission parameter value, wherein sending the second configuration data occurs no earlier than the transmission of the portion of the PRS resource.

An example method of processing secured Positioning Reference Signals (PRS) resources for positioning of a user equipment (UE) in a wireless communication network, according to this disclosure, includes receiving, from a network entity, first configuration data indicative of a period of time during which at least a portion of a PRS resource is to be transmitted using one or more Orthogonal Frequency Division Multiplexing (OFDM) symbols. The first configuration data is received prior to transmission of the portion of the PRS resource by a Transmission and Reception Point (TRP) of the wireless communication network, and the first configuration data excludes at least one transmission parameter value for generating a waveform for each of the one or more OFDM symbols. The method further comprises processing buffering data from signals received by the TRP during the period of time. The method further comprises processing receiving, from the network entity, second configuration data indicative of the at least one transmission parameter value, wherein the second configuration data is received no earlier than the transmission of the portion of the PRS resource. The method further comprises processing the portion of the PRS resource using the at least one transmission parameter value on at least a portion of the buffered data to generate a waveform for each of the one or more OFDM symbols.

An example network entity for securing Positioning Reference Signals (PRS) resources for positioning of a user equipment (UE) in a wireless communication network, according to this disclosure, includes a transceiver, a memory, and one or more processing units communicatively coupled to the transceiver and the memory. The one or more processing units are configured to send, to the UE via the transceiver, first configuration data indicative of a period of time during which at least a portion of a PRS resource is to be transmitted using one or more Orthogonal Frequency Division Multiplexing (OFDM) symbols, where the one or more processing units are configured to send the first configuration data occurs prior to transmission of the portion of the PRS resource by a Transmission and Reception Point (TRP) of the wireless communication network, and the one or more processing units are configured to exclude, from the first configuration data, at least one transmission parameter value for generating a waveform for each of the one or more OFDM symbols. The one or more processing units are also configured to send, to the UE via the transceiver, second configuration data indicative of the at least one transmission parameter value, wherein sending the second configuration data occurs no earlier than the transmission of the portion of the PRS resource.

An example user equipment (UE) for processing secured Positioning Reference Signals (PRS) resources for positioning of the UE in a wireless communication network, according to this description, includes a transceiver; a memory; and one or more processing units communicatively coupled to the transceiver and the memory. The one or more processing units are configured to receive, from a network entity via the transceiver, first configuration data indicative of a period of time during which at least a portion of a PRS resource is to be transmitted using one or more Orthogonal Frequency Division Multiplexing (OFDM) symbols, where the first configuration data is received prior to transmission of the portion of the PRS resource by a Transmission and Reception Point (TRP) of the wireless communication network, and the first configuration data excludes at least one transmission parameter value for generating a waveform for each of the one or more OFDM symbols. The one or more processing units are also configured to buffer data from signals received by the TRP during the period of time. The one or more processing units are also configured to receive, from a network entity via the transceiver, second configuration data indicative of the at least one transmission parameter value, where the second configuration data is received no earlier than the transmission of the portion of the PRS resource. The one or more processing units are also configured to process the portion of the PRS resource using the at least one transmission parameter value on at least a portion of the buffered data to generate a waveform for each of the one or more OFDM symbols.

Figure 1:
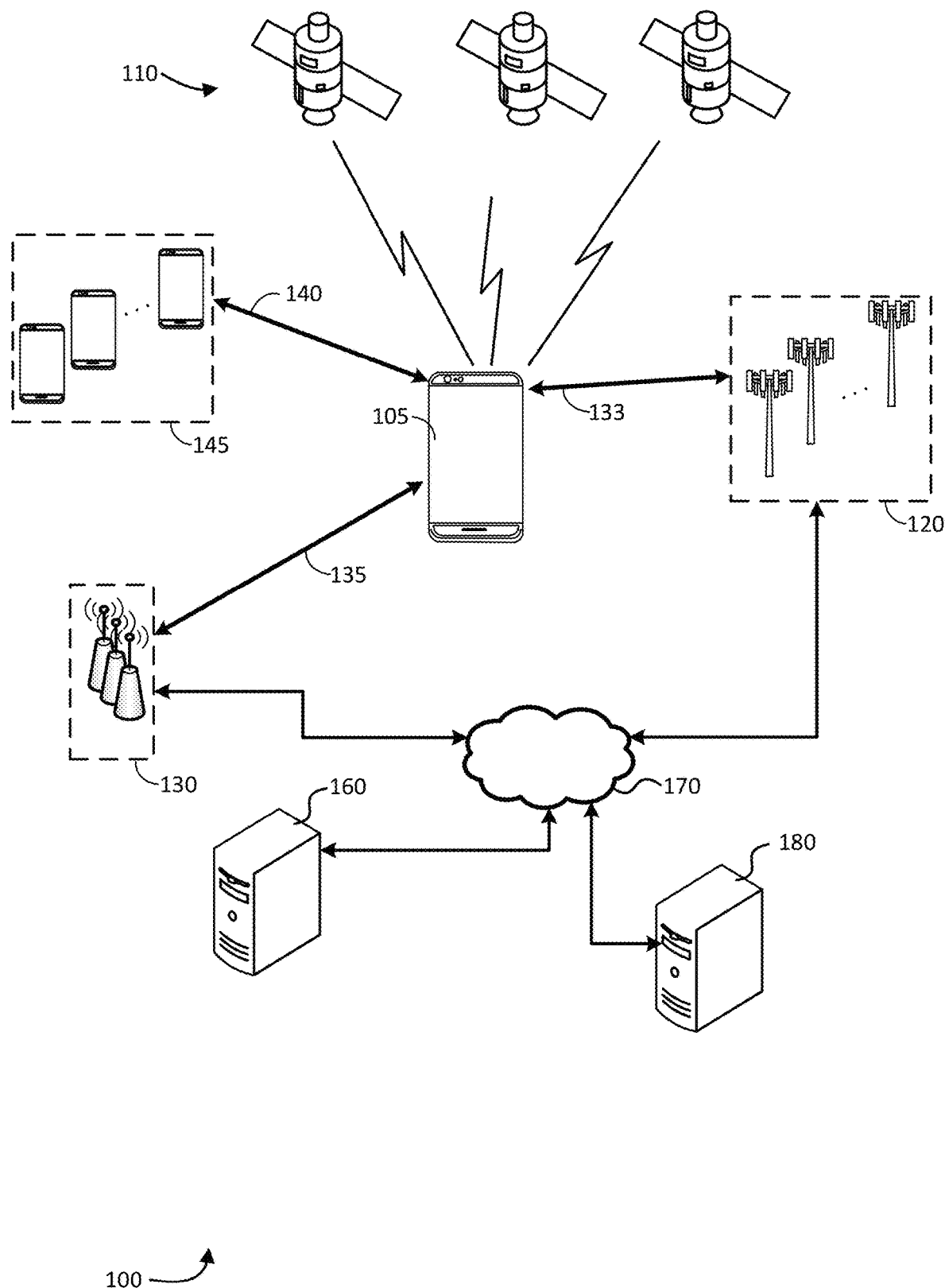
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Additionally, as used herein, the term "transmission parameter" may refer to a parameter used to decode an encoded RF signal by re-creating waveforms of the RF signal. As described herein, transmission parameters may vary, and may include a scrambling ID, frequency-domain parameter, comb pattern, Orthogonal Frequency-Division Multiplexing (OFDM) symbol offset, and the like. Transmission parameters may refer to values for these particular transmission parameter types.

As previously indicated, in a wireless communication network such as a 5th Generation (5G) New Radio (NR) or other cellular network, a location estimation of a user equipment (UE) (a mobile device within the network) may be determined by the UE measuring reference signals transmitted by one or more Transmission Reception Points (TRPs). These reference signals, specifically positioning reference signal (PRS) resources, are encoded. However, as noted, they may be vulnerable to an attacker that decodes a first portion of a reference signal and mimics a subsequent portion or repetition of the reference signal. Embodiments described herein provide for securing such PRS resources from such attacks by withholding the conveyance of transmission parameters for decoding portions of a PRS resource until after the portions the PRS resource are transmitted, thereby preventing an attack. Thus, receiving devices can buffer received signals and, after receiving the transmission parameters, process the buffered signals. To further prevent an attacker device from attacking future reference signals, transmission parameters can be nondeterministic such that an attacker device obtaining a parameter at a certain period of time is unable to use the decoded parameter predict or determine subsequent transmission parameters. A detailed description of these embodiments is provided after a description of systems and technologies related to these embodiments.

FIG. 1 is a simplified illustration of a positioning system 100 in which a UE 120, location server 160, and/or other components of the positioning system 100 can use the techniques provided herein for securing PRS resources for positioning of a UE in a wireless communication network, according to an embodiment. The techniques described herein may be implemented by one or more components of the positioning system 100. The positioning system 100 can include: a UE 120; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 120 based on RF signals received by and/or sent from the UE 120 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 120 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 120 can send and receive information with network-connected devices, such as location server 160, by accessing the network 170 via a base station 120 using a first communication link 133. Additionally or alternatively, because APs 130 also may be communicatively coupled with the network 170, UE 120 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), enhanced mobile broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 120 and/or provide data (e.g., "assistance data") to UE 120 to facilitate location measurement and/or location determination by UE 120. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 120 based on subscription information for UE 120 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 120 using a control plane (CP) location solution for LTE radio access by UE 120. The location server 160 may further comprise a Location Management Function (LMF) that supports location of UE 120 using a control plane (CP) location solution for NR or LTE radio access by UE 120.

In a CP location solution, signaling to control and manage the location of UE 120 may be exchanged between elements of network 170 and with UE 120 using existing network interfaces and protocols and as signaling from the perspective of network 170. In a UP location solution, signaling to control and manage the location of UE 120 may be exchanged between location server 160 and UE 120 as data (e.g. data transported using the Internet Protocol (IP) and/or Transmission Control Protocol (TCP)) from the perspective of network 170.

As previously noted (and discussed in more detail below), the estimated location of UE 120 may be based on measurements of RF signals sent from and/or received by the UE 120. In particular, these measurements can provide information regarding the relative distance and/or angle of the UE 120 from one or more components in the positioning system 100 (e.g., GNSS satellites 110, APs 130, base stations 120). The estimated location of the UE 120 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 120 may be estimated at least in part based on measurements of RF signals 140 communicated between the UE 120 and one or more other UEs 145, which may be mobile or fixed. When or more other UEs 145 are used in the position determination of a particular UE 120, the UE 120 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 120 may comprise sidelink and/or similar Device-to-Device (D2D) communication technologies. Sidelink, which is defined by 3GPP, is a form of D2D communication under the cellular-based LTE and NR standards.

An estimated location of UE 120 can be used in a variety of applications—e.g. to assist direction finding or navigation for a user of UE 120 or to assist another user (e.g. associated with external client 180) to locate UE 120. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 120 may comprise an absolute location of UE 120 (e.g. a latitude and longitude and possibly altitude) or a relative location of UE 120 (e.g. a location expressed as distances north or south, east or west and possibly above or below some other known fixed location or some other location such as a location for UE 120 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 120 is expected to be located with some level of confidence (e.g. 95% confidence).

The external client 180 may be a web server or remote application that may have some association with UE 120 (e.g. may be accessed by a user of UE 120) or may be a server, application, or computer system providing a location service to some other user or users which may include obtaining and providing the location of UE 120 (e.g. to enable a service such as friend or relative finder, asset tracking or child or pet location). Additionally or alternatively, the external client 180 may obtain and provide the location of UE 120 to an emergency services provider, government agency, etc.

Figure 2:
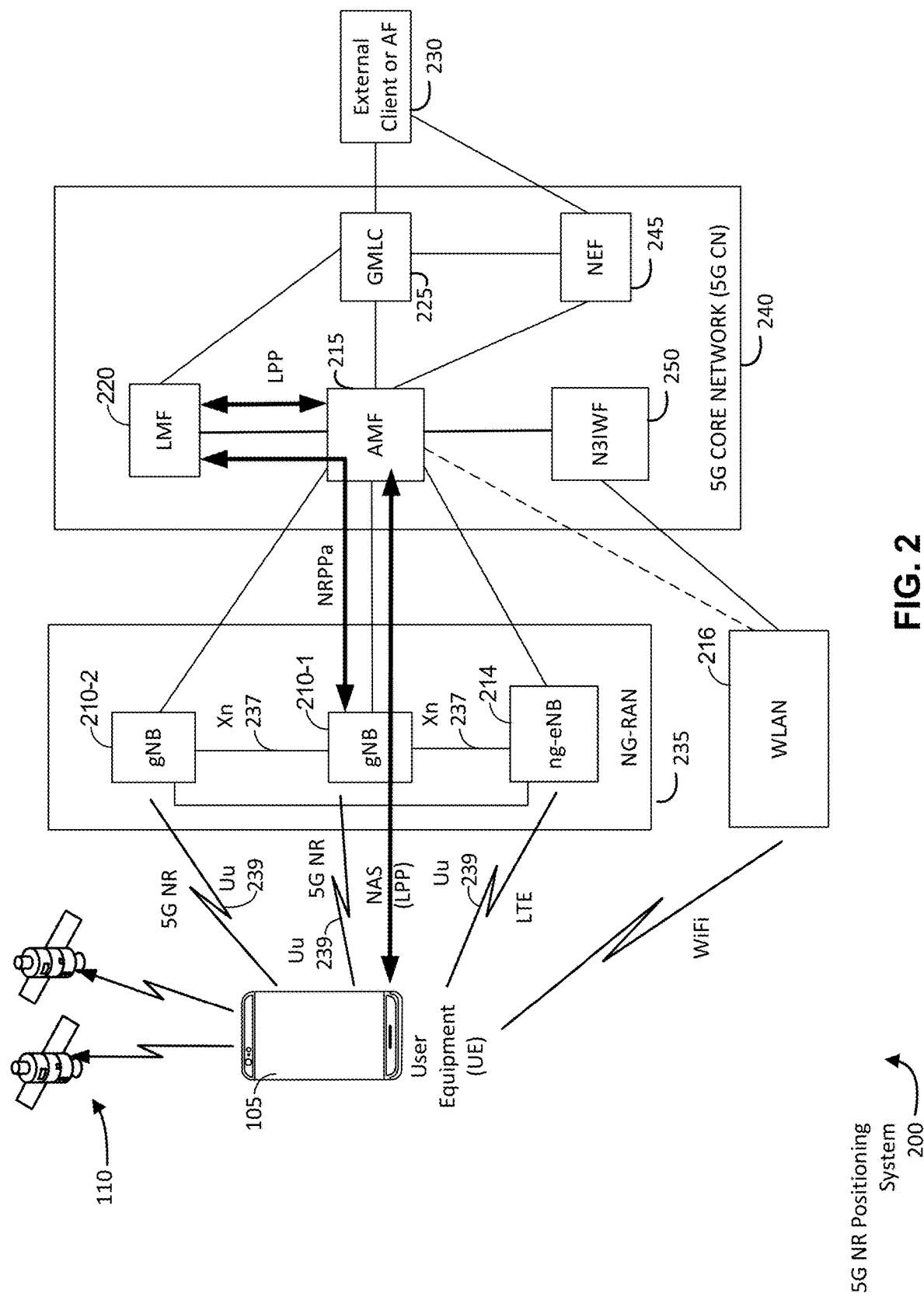
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 120 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 120, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 120 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 120 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 120 may correspond to a cellphone, smartphone, laptop, tablet, personal data assistant (PDA), tracking device, navigation device, Internet of Things (IoT) device, or some other portable or moveable device. Typically, though not necessarily, the UE 120 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 120 may also support wireless communication using a WLAN 216 which (like the one or more RATs, and as previously noted with respect to FIG. 1) may connect to other networks, such as the Internet. The use of one or more of these RATs may allow the UE 120 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 120 (e.g., via the GMLC 225). The external client 230 of FIG. 2 may correspond to external client 180 of FIG. 1, as implemented in or communicatively coupled with a 5G NR network.

The UE 120 may include a single entity or may include multiple entities, such as in a personal area network where a user may employ audio, video and/or data I/O devices, and/or body sensors and a separate wireline or wireless modem. An estimate of a location of the UE 120 may be referred to as a location, location estimate, location fix, fix, position, position estimate, or position fix, and may be geodetic, thus providing location coordinates for the UE 120 (e.g., latitude and longitude), which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 95%, etc.). A location of the UE 120 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 120 via wireless communication between the UE 120 and one or more of the gNBs 210, which may provide wireless communications access to the 5G CN 240 on behalf of the UE 120 using 5G NR. The wireless interface between base stations (gNBs 210 and/or ng-eNB 214) and the UE 120 may be referred to as a Uu interface 239. 5G NR radio access may also be referred to as NR radio access or as 5G radio access. In FIG. 2, the serving gNB for UE 120 is assumed to be gNB 210-1, although other gNBs (e.g. gNB 210-2) may act as a serving gNB if UE 120 moves to another location or may act as a secondary gNB to provide additional throughput and bandwidth to UE 120.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 120. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 120 but may not receive signals from UE 120 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 120 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 120 to other elements in 5G CN 240 and/or may support interworking of one or more protocols used by WLAN 216 and UE 120 to one or more protocols used by other elements of 5G CN 240 such as AMF 215. For example, N3IWF 250 may support IPSec tunnel establishment with UE 120, termination of IKEv2/IPSec protocols with UE 120, termination of N2 and N3 interfaces to 5G CN 240 for control plane and user plane, respectively, relaying of uplink (UL) and downlink (DL) control plane Non-Access Stratum (NAS) signaling between UE 120 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 120 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 120) and/or obtain downlink (DL) location measurements from the UE 120 that were obtained by UE 120 for DL signals received by UE 120 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 120, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 120 may be applicable to such other networks.

The gNBs 210 and ng-eNB 214 can communicate with an AMF 215, which, for positioning functionality, communicates with an LMF 220. The AMF 215 may support mobility of the UE 120, including cell change and handover of UE 120 from an access node 210, 214, or 216 of a first RAT to an access node 210, 214, or 216 of a second RAT. The AMF 215 may also participate in supporting a signaling connection to the UE 120 and possibly data and voice bearers for the UE 120. The LMF 220 may support positioning of the UE 120 using a CP location solution when UE 120 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 120, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 120's location) may be performed at the UE 120 (e.g., by measuring downlink PRS (DL-PRS) signals transmitted by wireless nodes such as gNBs 210, ng-eNB 214 and/or WLAN 216, and/or using assistance data provided to the UE 120, e.g., by LMF 220).

The Gateway Mobile Location Center (GMLC) 225 may support a location request for the UE 120 received from an external client 230 and may forward such a location request to the AMF 215 for forwarding by the AMF 215 to the LMF 220. A location response from the LMF 220 (e.g., containing a location estimate for the UE 120) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 120 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 120 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 120 may communicate using an LTE Positioning Protocol (LPP) as defined in 3GPP TS 37.355. Here, LPP messages may be transferred between the UE 120 and the LMF 220 via the AMF 215 and a serving gNB 210-1 or serving ng-eNB 214 for UE 120. For example, LPP messages may be transferred between the LMF 220 and the AMF 215 using messages for service-based operations (e.g., based on the Hypertext Transfer Protocol (HTTP)) and may be transferred between the AMF 215 and the UE 120 using a 5G NAS protocol. The LPP protocol may be used to support positioning of UE 120 using UE assisted and/or UE based position methods such as A-GNSS, RTK, TDOA, multi-cell RTT, AoD, and/or ECID. The NRPPa protocol may be used to support positioning of UE 120 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 120 access to WLAN 216, LMF 220 may use NRPPa and/or LPP to obtain a location of UE 120 in a similar manner to that just described for UE 120 access to a gNB 210 or ng-eNB 214. Thus, NRPPa messages may be transferred between a WLAN 216 and the LMF 220, via the AMF 215 and N3IWF 250 to support network-based positioning of UE 120 and/or transfer of other location information from WLAN 216 to LMF 220. Alternatively, NRPPa messages may be transferred between N3IWF 250 and the LMF 220, via the AMF 215, to support network-based positioning of UE 120 based on location related information and/or location measurements known to or accessible to N3IWF 250 and transferred from N3IWF 250 to LMF 220 using NRPPa. Similarly, LPP and/or LPP messages may be transferred between the UE 120 and the LMF 220 via the AMF 215, N3IWF 250, and serving WLAN 216 for UE 120 to support UE assisted or UE based positioning of UE 120 by LMF 220.

In a 5G NR positioning system 200, positioning methods can be categorized as being "UE assisted" or "UE based." This may depend on where the request for determining the position of the UE 120 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 120 may obtain location measurements and send the measurements to a location server (e.g., LMF 220) for computation of a location estimate for UE 120. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (ToA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 120 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 120 may obtain location measurements (e.g., which may be the same as or similar to location measurements for a UE assisted position method) and may further compute a location of UE 120 (e.g., with the help of assistance data received from a location server such as LMF 220, an SLP, or broadcast by gNBs 210, ng-eNB 214, or WLAN 216).

With a network based position method, one or more base TRPs (e.g., base stations gNBs 210 and/or ng-eNB 214), one or more APs (e.g., in WLAN 216), or N3IWF 250 may obtain location measurements (e.g., measurements of RSSI, RTT, RSRP, RSRQ, AoA, or ToA) for signals transmitted by UE 120, and/or may receive measurements obtained by UE 120 or by an AP in WLAN 216 in the case of N3IWF 250, and may send the measurements to a location server (e.g., LMF 220) for computation of a location estimate for UE 120.

Positioning of the UE 120 also may be categorized as UL, DL, or DL-UL based, depending on the types of signals used for positioning. If, for example, positioning is based solely on signals received at the UE 120 (e.g., from a TRP or other UE), the positioning may be categorized as DL based. On the other hand, if positioning is based solely on signals transmitted by the UE 120 (which may be received by a TRP or other UE, for example), the positioning may be categorized as UL based. Positioning that is DL-UL based includes positioning, such as RTT-based positioning, that is based on signals that are both transmitted and received by the UE 120. Sidelink (SL)-assisted positioning comprises signals communicated between the UE 120 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by TRPs or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
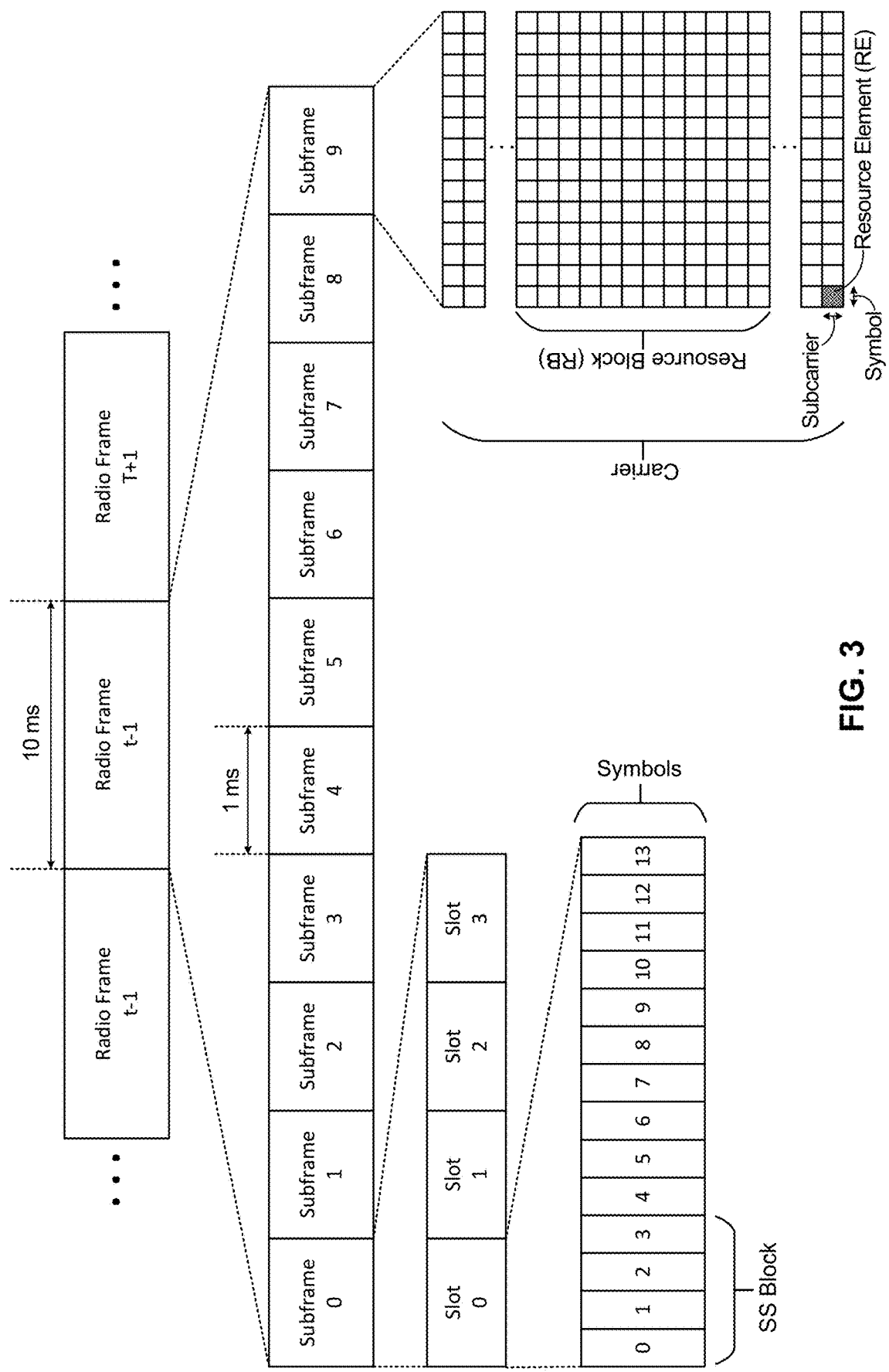
FIG. 3 is a diagram showing an example of a frame structure for NR and associated terminology.
Figure 4:
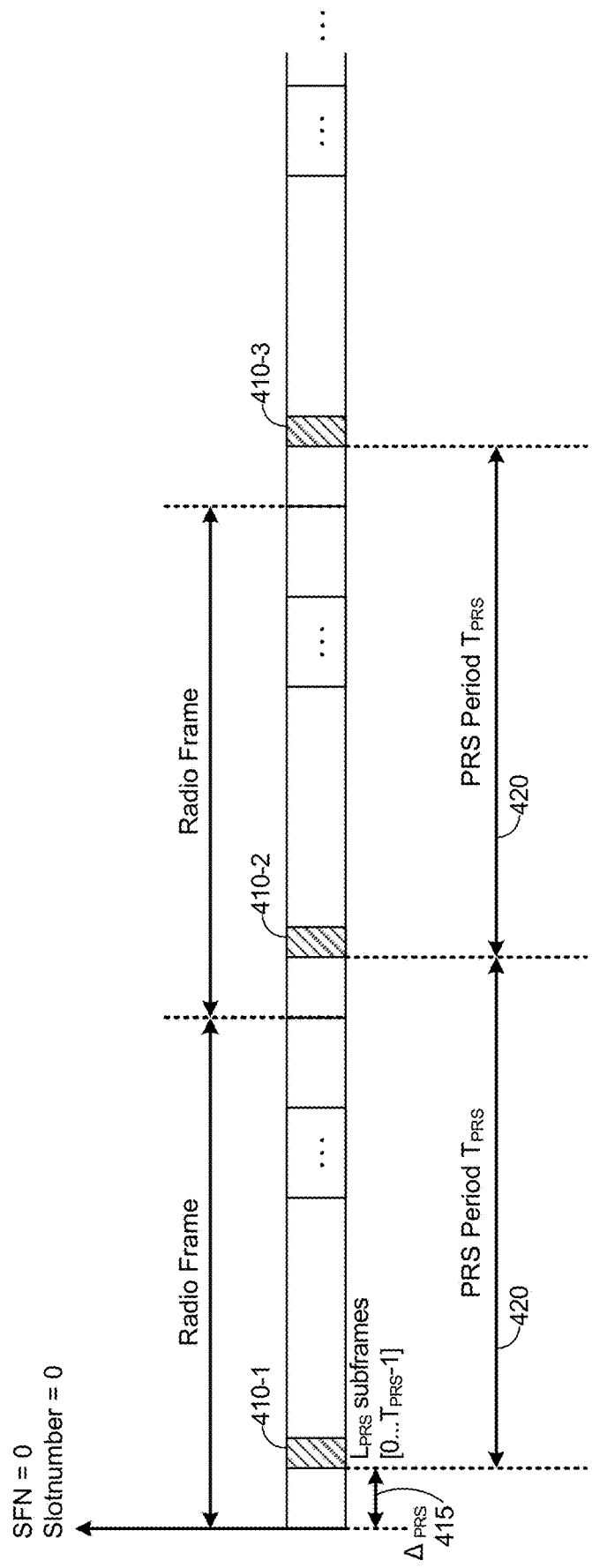
FIG. 4 is a diagram showing an example of a radio frame sequence with Positioning Reference Signal (PRS) positioning occasions, according to an embodiment.

FIG. 3 is a diagram showing an example of a frame structure for NR and associated terminology, which can serve as the basis for physical layer communication between the UE 120 and base stations, such as serving gNB 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete OFDM of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

FIG. 4 is a diagram showing an example of a radio frame sequence 400 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition." Subframe sequence 400 may be applicable to broadcast of PRS signals (DL-PRS signals) from base stations 120 in positioning system 100. The radio frame sequence 400 may be used in 5G NR (e.g., in 5G NR positioning system 200) and/or in LTE. Similar to FIG. 4, time is represented horizontally (e.g., on an X axis) in FIG. 4, with time increasing from left to right. Frequency is represented vertically (e.g., on a Y axis) with frequency increasing (or decreasing) from bottom to top.

FIG. 4 shows how PRS positioning occasions 410-1, 410-2, and 410-3 (collectively and generically referred to herein as positioning occasions 410) are determined by a System Frame Number (SFN), a cell-specific subframe offset ($\Delta_{PRS}$) 415, a length or span of $L_{PRS}$ subframes, and the PRS periodicity ($T_{PRS}$) 420. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 415 may be defined in terms of the number of subframes transmitted starting from System Frame Number (SFN) 0 to the start of the first (subsequent) PRS positioning occasion.

A PRS may be transmitted by wireless nodes (e.g., TRPs) after appropriate configuration (e.g., by an Operations and Maintenance (O & M) server). A PRS may be transmitted in special positioning subframes or slots that are grouped into positioning occasions 410. For example, a PRS positioning occasion 410-1 can comprise a number NPRS of consecutive positioning subframes where the number NPRS may be between 1 and 160 (e.g., may include the values 1, 2, 4 and 6 as well as other values). PRS occasions 410 may be grouped into one or more PRS occasion groups. As noted, PRS positioning occasions 410 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some aspects, $T_{PRS}$ may be measured in terms of the number of subframes between the start of consecutive positioning occasions.

In some aspects, when a UE 120 receives a PRS configuration index $I_{PRS}$ in the assistance data for a particular cell (e.g., TRP), the UE 120 may determine the PRS periodicity $T_{PRS}$ 420 and cell-specific subframe offset ($\Delta_{PRS}$) 415 using stored indexed data. The UE 120 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 415) relative to other cells in the network that use a different frequency. In SFN-synchronous networks all wireless nodes (e.g., TRPs/base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 120 may determine the timing of the PRS occasions 410 of the reference and neighbor cells for TDOA positioning, if the UE 120 can obtain the cell timing (e.g., SFN or Frame Number) of at least one of the cells, e.g., the reference cell or a serving cell. The timing of the other cells may then be derived by the UE 120 based, for example, on the assumption that PRS occasions from different cells overlap.

Figure 5:
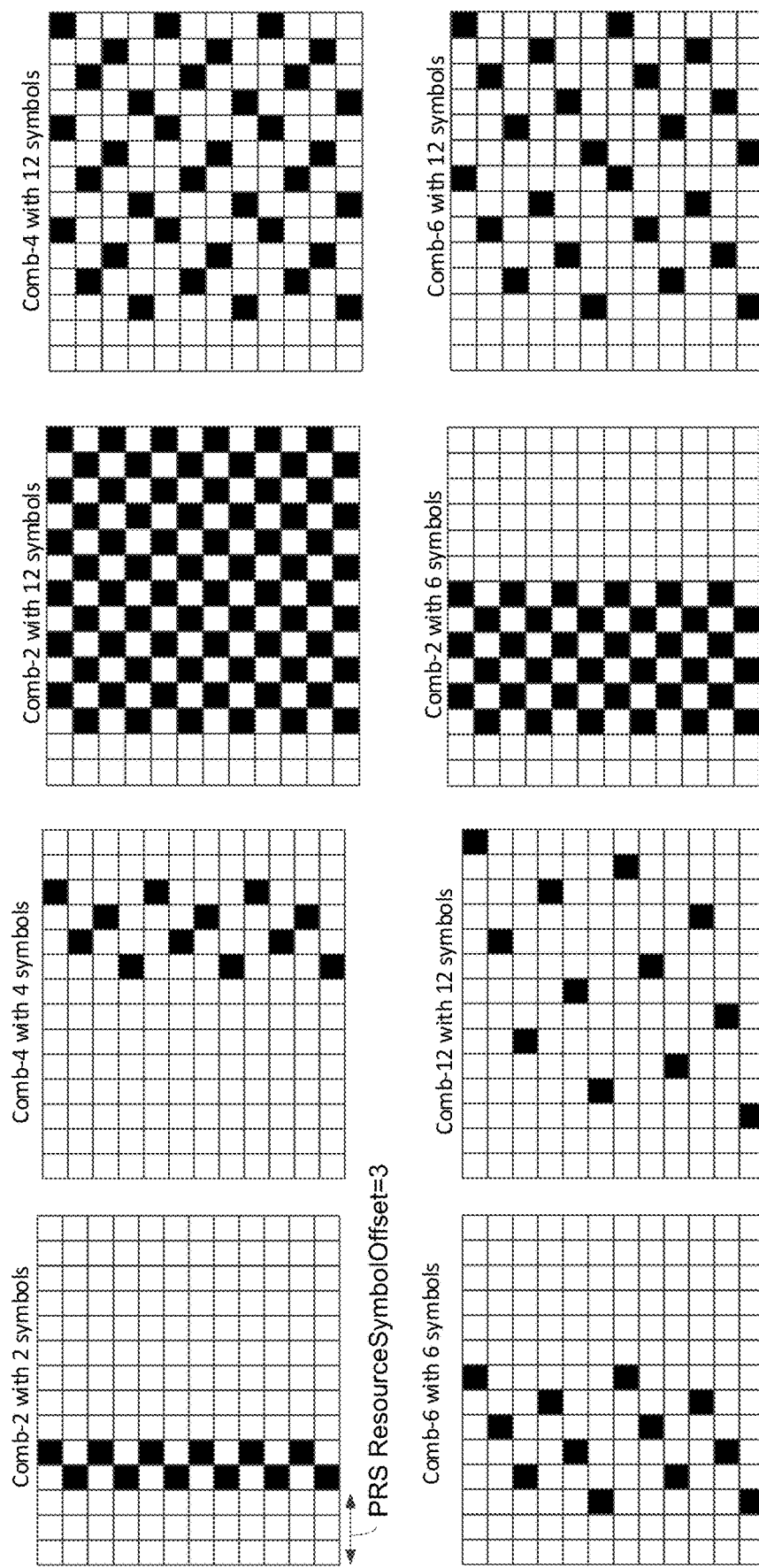
FIG. 5 illustrates multiple example comb structures that can be used for communicating reference signals for positioning, according to an embodiment.

With reference to the frame structure in FIG. 4, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular comb size (also referred to as the "comb density"). A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 5.

A "PRS resource set" is a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set may have the same periodicity, a common muting pattern configuration, and the same repetition factor across slots. The periodicity may have a length selected from $2^m$. {4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (e.g., 210, 214, 216) may transmit frames, or other physical layer signaling sequences, supporting PRS signals (i.e. a DL-PRS) according to frame configurations as previously described, which may be measured and used for position determination of the UE 120. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 6:
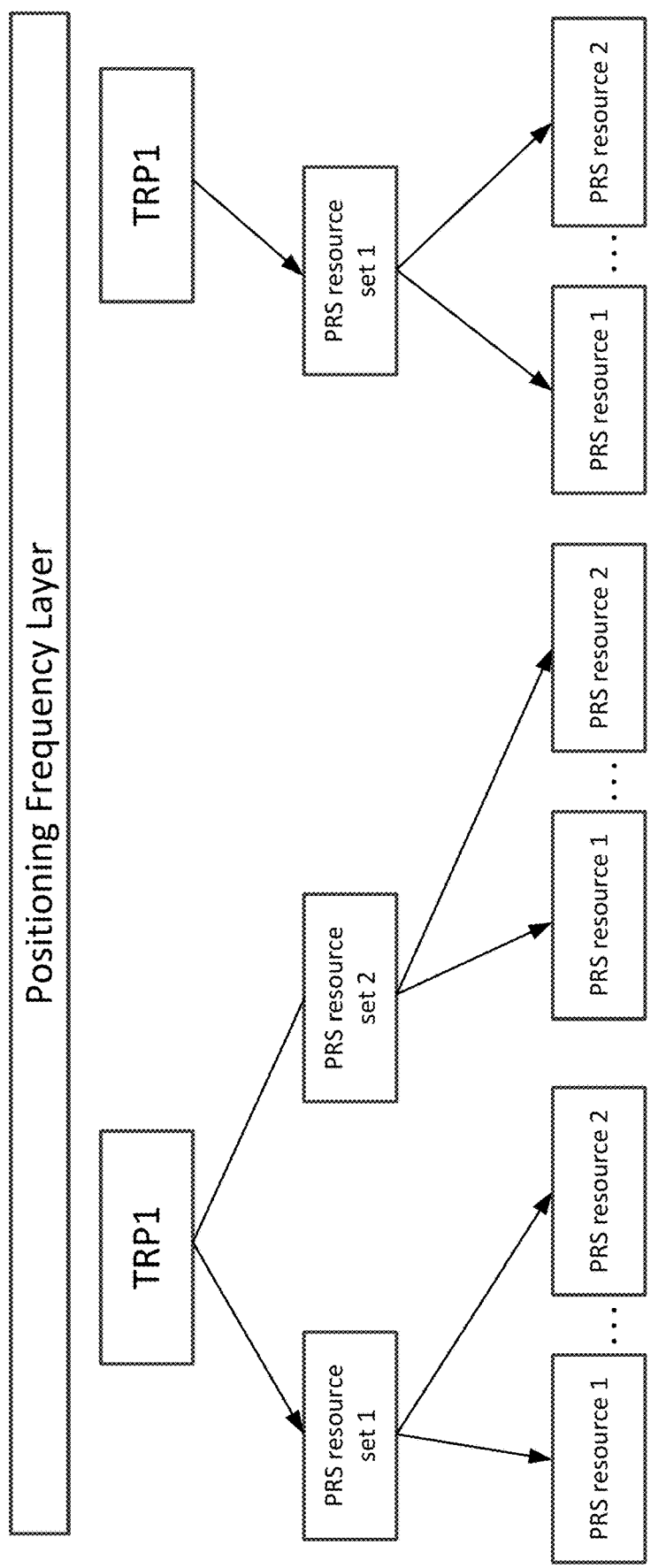
FIG. 6 is a diagram of an example hierarchical structure of reference signal recourses that can be used for positioning, according to an embodiment.

FIG. 6 is a diagram of a hierarchical structure of how PRS resources and PRS resource sets may be used by different TRPs of a given position frequency layer (PFL), as defined in 5G NR. With respect to a network (Uu) interface, a UE 120 can be configured with one or more DL-PRS resource sets from each of one or more TRPs. Each DL-PRS resource set includes K≥1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 120 can be configured with up to four DL-PRS PFLs.

Figure 7:
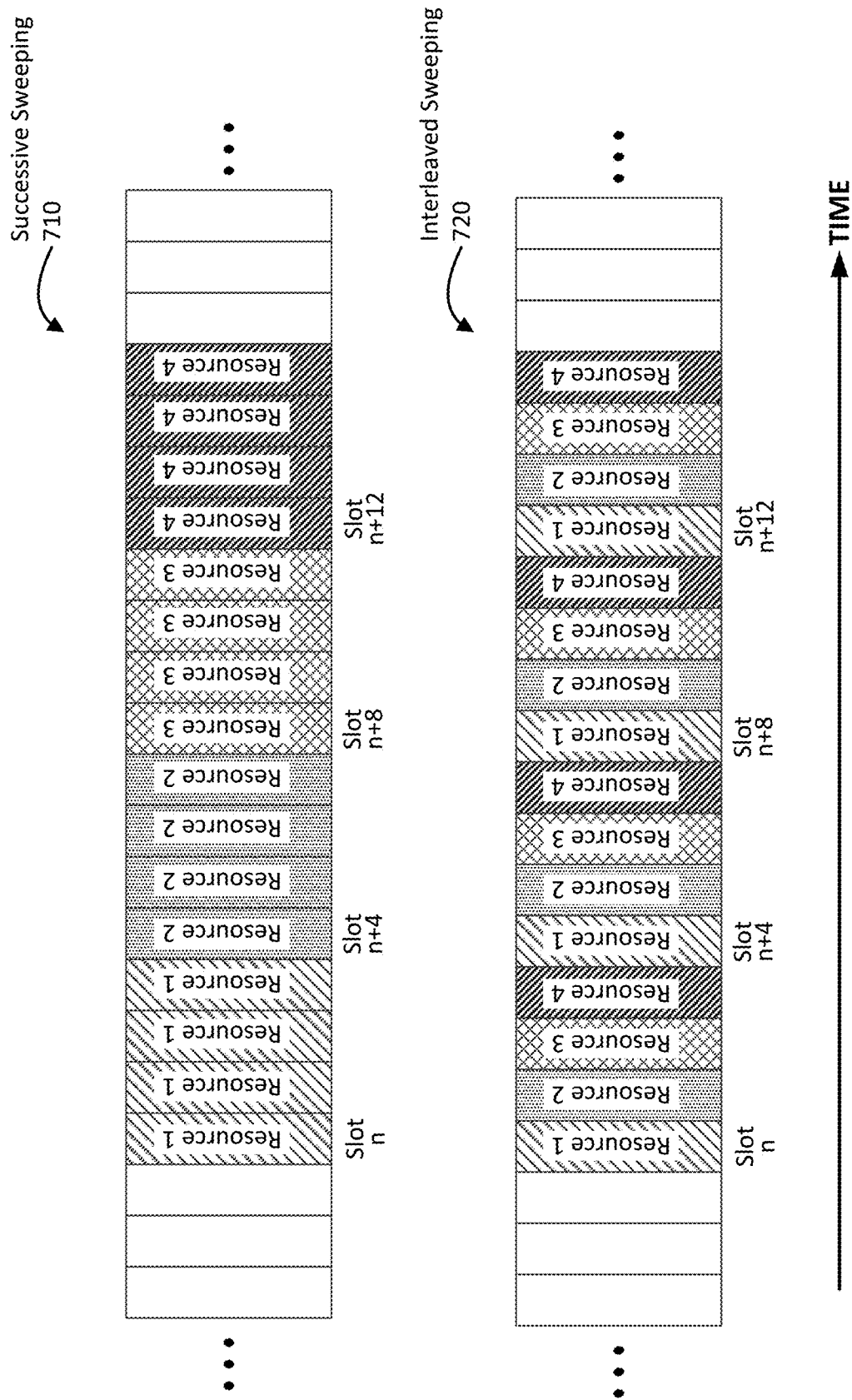
FIG. 7 is a time diagram illustrating two different options for slot usage of a resource set, according to an embodiment.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 7, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes.

FIG. 7 is a time diagram illustrating two different options for slot usage of a resource set, according to an embodiment. Because each example repeats each resource four times, the resource set is said to have a repetition factor of four. Successive sweeping 710 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 720, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single FL, and a UE may be capable of taking measurements of PRS resources transmitted via multiple FLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As previously noted, reference signals such as the PRS resources previously described and illustrated with regard to FIG. 4-7 may be vulnerable to an attack that could interfere with in the position determination of a UE measuring these PRS resources. These attacks include "man-in-the-middle" attacks where a device transmits illegitimate reference signals (referred to herein as "attacker signals") that mimic legitimate reference signals (also referred to herein simply as "reference signals") received by the device. Additional details regarding these types of attacks are provided hereafter in reference to FIGS. 8A-8B.

Figure 8A:
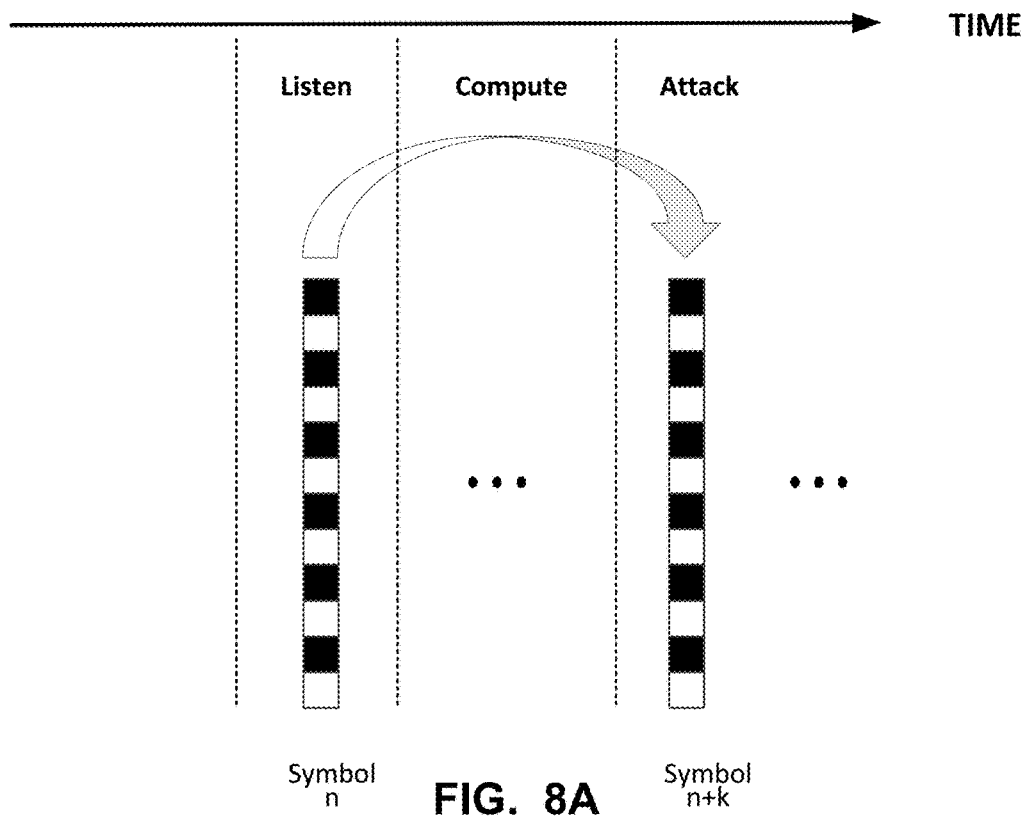
FIGS. 8A and 8B are diagrams illustrating examples of how man-in-the-middle attacks on reference signals may be performed.
Figure 8B:
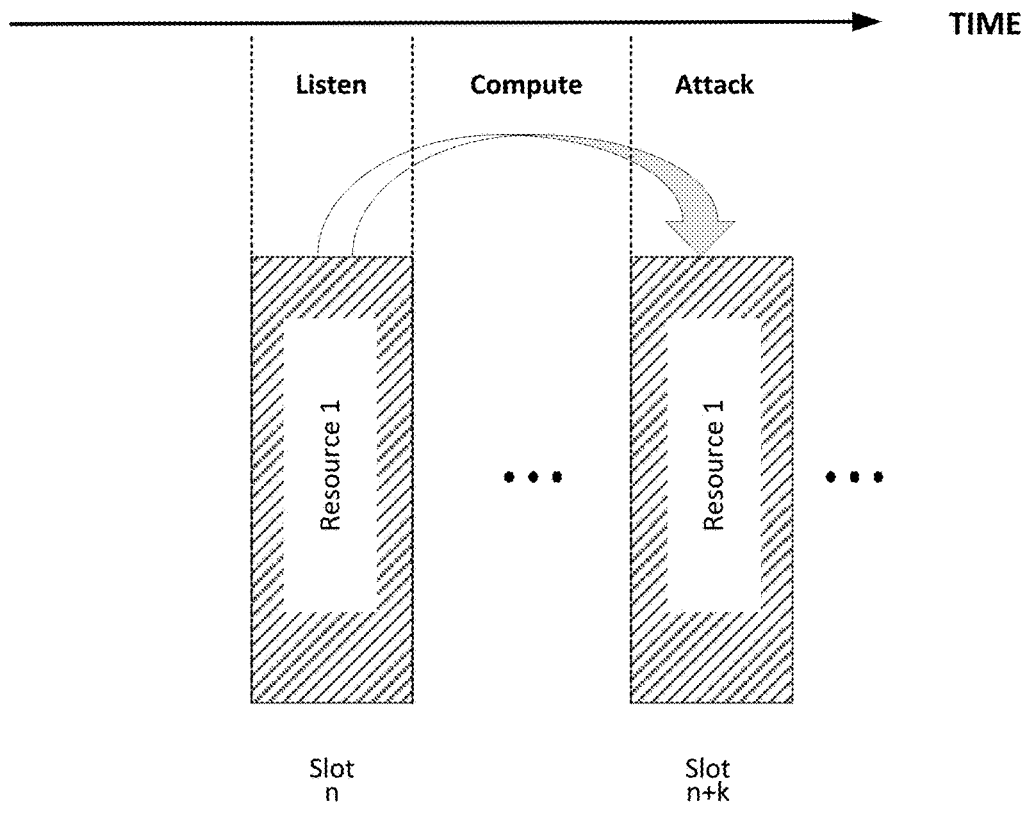

FIGS. 8A and 8B are diagrams illustrating examples of how man-in-the-middle attacks (or "spoofing") of reference signals may be performed by an attacking device on reference signals for positioning of a UE in a wireless network, from a physical layer perspective. Similar to FIGS. 3-5 and 7, time is represented on the horizontal axis, from left to right.

As illustrated, the functionality of an attacking device performing a man-in-the-middle attack may cycle through a "listen" mode to a "compute" mode, then to an "attack" mode. In the listen mode, the attacking device listens a first part of a reference signal, tuning one or more transceivers to capture portions of the reference signal transmitted on relevant frequencies. During the compute mode, the attacking device can use brute force or other algorithms to decode the portion of the transmitted reference signal, if decoding information is not previously known by the attacking device. During the attack mode, the attacking device can make one or more transmissions to mimic a second part of the reference signal and/or subsequent reference signals.

FIG. 8A illustrates an "across-symbol" attack, which is an attack at the symbol level of a reference signal. Here, the attacking device may listen to one or more initial symbols (e.g., symbol n) of a legitimate reference signal and attack by mimicking one or more subsequent portions of the reference signal in one or more subsequent symbols (e.g., symbol n+k). The listen, compute, and attack modes of the attacking device may vary, depending factors such as the algorithms used to decode the symbol(s) listened to, the processing capabilities of the attacking device, etc. In some attacks, there may be several symbols between symbol n and symbol n+k. In other attacks, the attack may take place on the symbol immediately following the symbol listened to (i.e., k=1). In across-symbol attacks, the attack may take place in the same slot that the reference signal is transmitted in (i.e., symbol n and symbol n+k are in the same slot).

FIG. 8B illustrates an "across-slot" attack, which is an attack at the slot level of a reference signal. Here, the attacking device may listen to a first portion of a legitimate reference signal in a first slot (slot n) and attack by mimicking one or more subsequent portions of the reference signal in one or more subsequent slots (e.g., slot n+k). Similar to an across-symbol attack, the listen, compute, and attack modes of the attacking device may vary. In some attacks, there may be several slots between slot n and slot n+k. In other attacks, the attack may take place on the slot immediately following the slot listened to (i.e., k=1). In slot attacks, the attack may take place between a first repetition of a reference signal and subsequent repetitions of the reference signal.

The way in which resource signals, such as DL-PRS, is encoded is often deterministic. That is, one or more transmission parameters used for encoding, such as a scrambling ID, are often generated using a (known) sequence generator. Thus, if an attacking device is able to determine an encoding parameter for a first symbol or slot, it may be able to use that encoding parameter in the sequence generator to generate encoding parameters for subsequent symbols or slots for entire series of resource signal references. For example, PRS resources are encoded with a scrambling ID that is generated using a pseudorandom sequence generator. Once an attacking device successfully decodes at least a portion of a PRS resource, it can determine the scrambling ID for that resource and use the pseudorandom sequence generator to generate the scrambling IDs for subsequent PRS resources in a sequence of PRS resources.

Figure 9A:
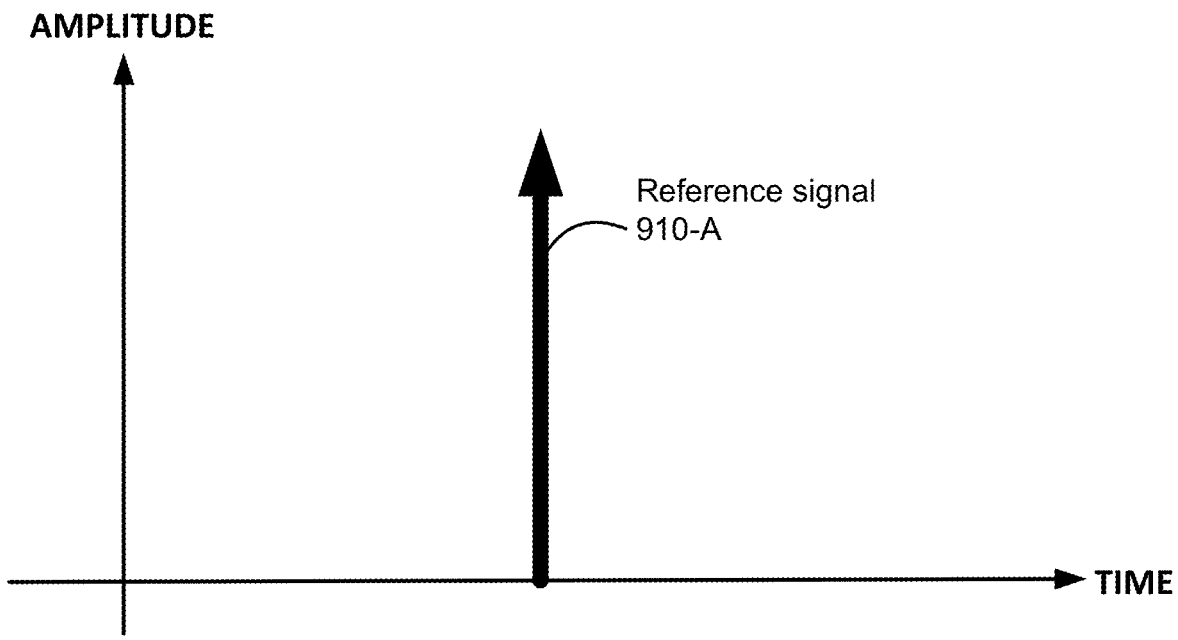
FIGS. 9A and 9B are diagrams that illustrate, from a timing perspective, how an attack may be perceived by receiving device, according to an embodiment.
Figure 9B:
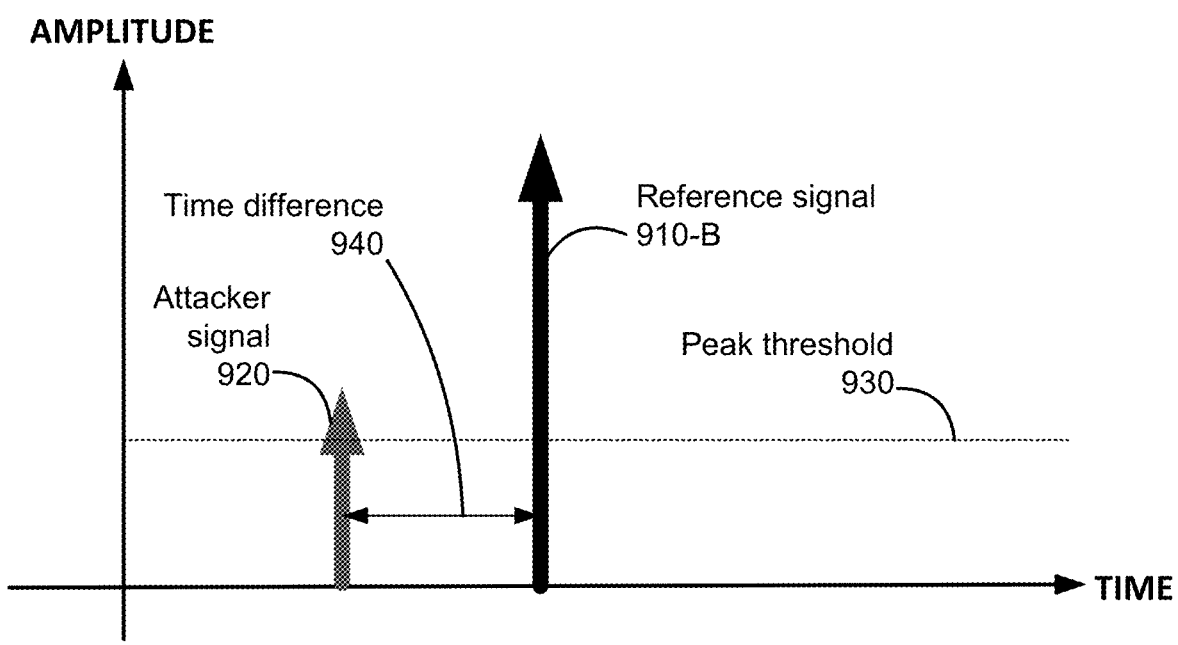

FIGS. 9A and 9B are diagrams that illustrate, from a timing perspective, how an attack may be perceived by a UE. An attack on reference signals measured by a UE can cause errors in the measurements made by the UE, which can lead to errors in the estimated location of the UE.

FIG. 9A is a diagram of a reference signal 910-A received by the receiving device. More specifically, the reference signal 910-A may represent a correlation peak of RF signals of a PRS resource transmitted during a symbol or slot, having a particular amplitude and received at a particular time. In practice, there may be multiple additional peaks, which can include noise, multi path, etc. these additional peaks can be filtered out using time and/or amplitude filtering techniques.

FIG. 9B is a diagram of a reference signal 910-B similar to the reference signal 910-A of FIG. 9A. Here, however, there is an additional attacker signal 920 that precedes the reference signal 910-B in time. And although the attacker signal 920 may not have as large an amplitude as the reference signal 910-B, the receiving device may interpret the attacker signal 920 as the reference signal 910-B if the attacker signal 920 exceeds a peak threshold 930 used to filter noise/multipath, etc.

If mistaken by the receiving device as the reference signal 910-B, the attacker signal 920 can cause an error in a measurement made by the receiving device for positioning of a target UE. For example, a time difference 940 between the attacker signal 920 and the legitimate reference signal 910-B can cause an error in a timing measurement of the reference signal 910-B by, for example, basing a ToA measurement (e.g., setting the ToA index) off of the time at which the attacker signal 920 is received, rather than a time at which the reference signal 910-B is received. Although sampling rates may vary, an attacker signal 920 that precedes a reference signal 910-B by just a few samples may result in a positioning error of many meters. This can be highly problematic in applications such as automated driving, where such an error in the estimated position of a vehicle may compromise the safety of passengers, pedestrians, and others.

Embodiments herein help prevent man-in-the-middle attacks, including across-symbol and across-slot attacks, by refraining from providing one or more transmission parameters to a UE for decoding at least a portion of a PRS resource until after the at least a portion of the PRS has been transmitted. The UE can buffer the signal and processes the buffered signals once the one or more transmission parameters are provided. Further, transmission parameters can be nondeterministic such that an attacker device obtaining a parameter at a certain period of time (e.g., a symbol, slot, or repetition) is unable to use the decoded parameter predict or determine subsequent transmission parameters.

Traditionally, for PRS resources, each resource has its own set of transmission parameters. Referring again to FIG. 7, for example, each resource, or beam (e.g., Resource 1 to Resource 4) would therefore have its own set of unique transmission parameters. These transmission parameters can include, for example, a resource ID, a sequence ID, a comb type, a slot offset, a symbol offset, and (optionally) a Quasi Co-Location (QCL). This information is included in assistance data provided to one or more UEs (e.g., it may be unicast, groupcast, or broadcast) to enable the one or more UEs to decode the PRS resource. As noted, an attacker device—a bad actor UE, for example—may attack a PRS resource by transmitting a signal that mimics the signal characteristics of the PRS resource, as conveyed in the transmission parameters. Further, because PRS resources transmitted by TRPs are often used by multiple UEs for positioning, a UE that receives unicast information regarding a PRS resource may conduct an attack by mimicking the PRS resource, which may likely be used by other nearby UEs.

Figure 10:
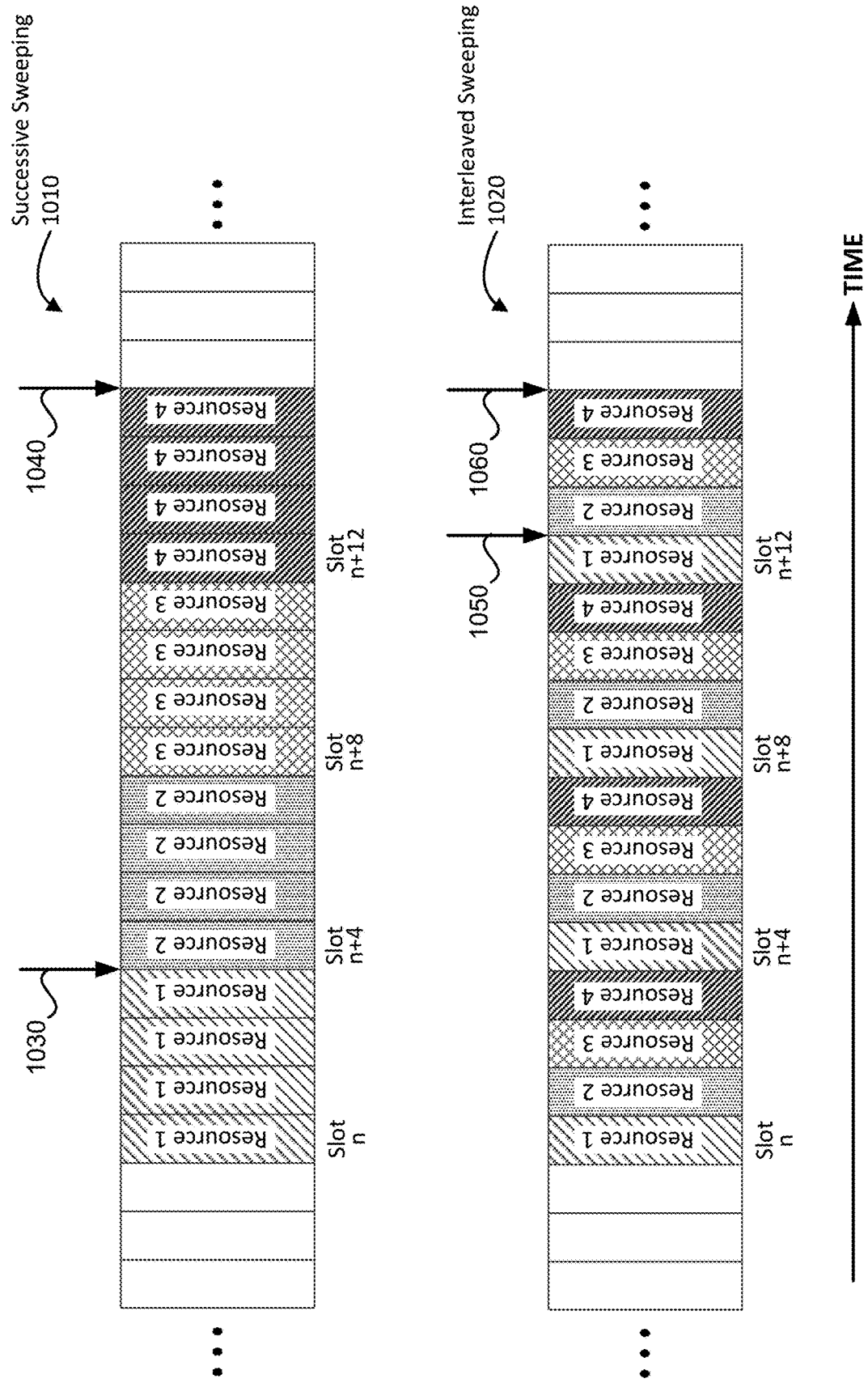
FIG. 10 is a time diagram that reproduces the successive sweeping and interleaved sweeping examples of beam sweeping illustrated in FIG. 7, with indications of when one or more transmission parameters for use in decoding Resource 1 may be sent to the user equipment (UE), according to some embodiments.

As noted, embodiments can help prevent across-symbol and/or across-slot attacks by refraining from providing one or more of these transmission parameters used for decoding at least a portion of a PRS resource until after the PRS resource (or the at least a portion thereof) has been transmitted. More specifically, a location server can refrain from providing these one or more transmission parameters in assistance data to the UE until after the portion of the PRS resource that uses the one or more parameters is transmitted. Depending on desired functionality, the one or more parameters that the location server refrains from providing may include a subset of the transmission parameters needed for decoding the PRS resource. This can include a single transmission parameter (e.g., a scrambling ID), multiple at transmission parameters, or all transmission parameters. FIG. 10 illustrates an example of when one or more transmission parameters can be sent.

FIG. 10 is a time diagram that reproduces the successive sweeping 1010 and interleaved sweeping 1020 examples of beam sweeping illustrated in FIG. 7. Here, however, different times (represented by arrows 1030, 1040, 1050, and 1060) are provided to show example times after which the location server may provide one or more transmission parameters for Resource 1 to one or more receiving UEs.

With regard to the successive sweeping 1010 example, for instance, the location server may refrain from providing one or more transmission parameters for decoding Resource 1 until after time 1030, after the last repetition of Resource 1 has been transmitted, at slot n+3. Additionally or alternatively, the location server may refrain from providing the one or more transmission parameters until after the entire sweep, at time 1040.

With regard to the interleaved sweeping 1020 example, the last repetition of resource 1 occurs at slot n+12, so the location server may provide one or more transmission parameters for decoding Resource 1 at time 1050 or thereafter. Again, according to some embodiments, the location server may refrain from providing the one or more transmission parameters until after the entire sweep, at time 1060.

Figure 11:
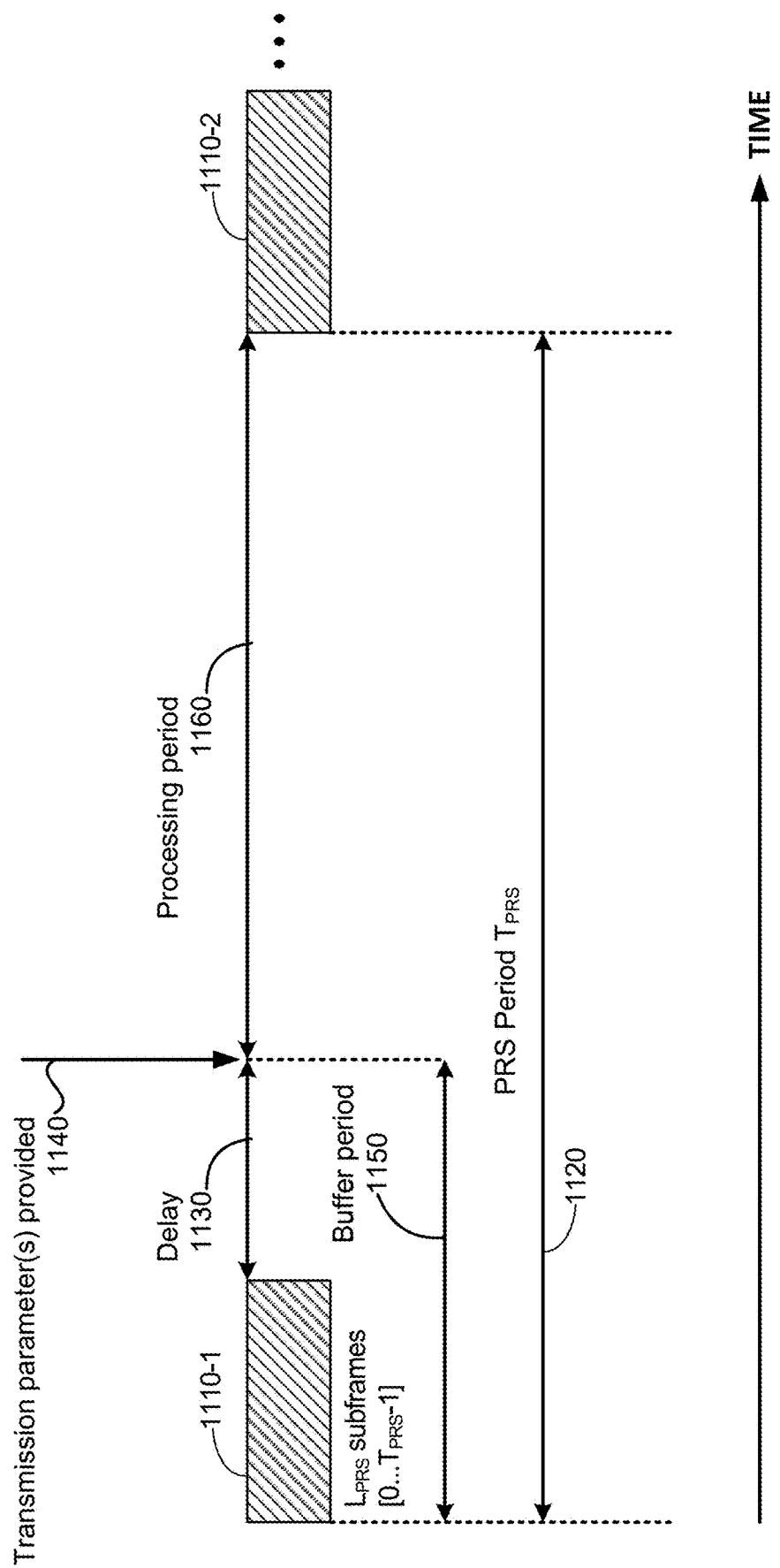
FIG. 11 is a time diagram illustrating how a UE can buffer and process PRS resources, according to an example.

As noted, each UE that will process the PRS resource can buffer RF signals transmitted in the symbols/slots used to convey the PRS resource, then process the PRS resource from the buffered RF signals after receiving the one or more withheld transmission parameters. FIG. 11 provides an example timeline of how this can be done.

FIG. 11 is a time diagram illustrating how a UE can buffer and process PRS resources, according to an example. Here, the repetition of PRS positioning occasions 1110 are illustrated in a manner similar to FIG. 3. Each PRS positioning occasion 1110, may therefore represent a full beam sweep of multiple PRS beams/resources (e.g., as illustrated in FIGS. 7 and 10). As noted, the length of the span of $L_{PRS}$ subframes (the length of PRS positioning occasions 1110) and/or PRS Periodicity ($T_{PRS}$) 1120 may vary. As an example, each positioning occasion 1110 may span 6 ms and PRS periodicity may be 160 ms. However, as previously noted, the lengths of either or both these time periods may vary.

To buffer and process PRS resources, UEs may buffer the $L_{PRS}$ subframes until the location server provides the needed one or more transmission parameters for decoding the PRS resource. As noted in with regard to FIGS. 10, this may occur during or after the positioning occasion 1010-1. However, as further indicated in FIG. 11 there may be a delay 1130 from after a positioning occasion 1110-1 and before the one or more transmission parameters are provided (at time 1140). This delay 1130 may allow some additional flexibility in timing to the network (e.g., to handle dropped packets, etc.) when providing the one or more transmission parameters. That said, implementations may set the delay 1130 to 0 ms in instances where the one or more transmission parameters may be provided immediately after the positioning occasion 1110.

Relevant specifications could specify a maximum delay 1130 for providing the one or more transmission parameters. Because traditional specification requirements allow for UE buffering of up to 50 ms, so a positioning occasion 1010-1 on the order of a few milliseconds to 10 ms or more, followed by a delay of a few ms (e.g., 3 ms), for example, should be easily accommodated by existing UEs. According to some embodiments, the delay 1130 may be up to 10 ms, 20 ms, or more, if needed. Assistance data provided by the location server prior to positioning occasions 1010 may comprise frequency, bandwidth, periodicity, and/or other basic information to allow a UE to buffer the relevant symbols/subcarriers.

The processing period 1160 is a period of time in which the UE processes the buffered information using the one or more transmission parameters provided at time 1140 to determine a measurement (e.g., ToA measurement) of one or more PRS resources transmitted in the previous PRS occasion 1110-1. According to embodiments, the processing period 1160 may not necessarily extend the entire period between the time 1140 at which the one or more parameters are provided and the beginning of the next PRS occasion 1110-2. However, relevant specifications may account for delay 1130 by, for example, extending the period of time for which the UE can process PRS information and/or by delaying the time at which the processing period 1160 starts until time 1140. Additionally or alternatively, if the one or more transmission parameters are conveyed to the UE via a Media Access Control-Control Element (MAC-CE) message, the starting point for processing may correspond to a delay period after the slot that carries a ACK/NAK reply.

In addition to withholding at least one transmission parameter for decoding (e.g., generating the waveform of) at least a portion of a PRS resource until after the at least the portion of the PRS resources transmitted, embodiments may use one or more additional features to help ensure PRS resource securitization.

First, as previously indicated, a value of the at least one transmission parameter may change on a per-resource or per-symbol basis. That is, even if an attacker device is able to determine a value for the at least one transmission parameter using brute force techniques or other algorithms, the value may not be the same for the next symbol/resource. That said, as previously noted, some transmission parameters may be deterministic, enabling an attacker device to generate successive transmission parameter values upon determining a first transmission parameter value. This leads to the second way in which embodiments may secure PRS resources.

Second, a value of the at least one transmission parameter may be independent or nondeterministic of successive transmission parameter values. That is, the transmission parameter value for any given symbol/resource may not be indicative of the transmission parameter value for successive parameter values during a positioning session. For example, as previously noted, scrambling ID values for PRS resources used in a positioning session may be generated using a known pseudo-random scrambling ID generator. Thus, if the value for a scrambling ID of a first PRS resource is determined by an attacker device, the attacker device may use the scrambling ID generator to generate scrambling IDs for at least some successive PRS resources in a sequence of PRS resources. However, according to embodiments, PRS symbols or resources can be given different, unrelated scrambling IDs (and/or other parameter values), which can help ensure that brute force decoding of a first portion of a PRS resource will not enable an attacker to decode any following portions.

It can be noted that the granularity of transmission parameter value change may be different than the granularity of the independent/nondeterministic nature of the transmission parameter values. That is, a first embodiment may have different transmission parameter values on a per-symbol basis where each value is independent/nondeterministic of a value for the transmission parameter of the subsequent symbol, however a second embodiment for which different transmission parameter values also change on a per-symbol basis may have some determinism, where symbols in the same slot, same repetition, or same resource may be related (e.g., values are determined using a same value generator). However, in the second embodiment, transmission parameter values within one PRS resource may be independent/nondeterministic of transmission parameter values of another PRS resource in a series of PRS resources used in a positioning session for the UE.

Depending on desired functionality, the transmission parameters withheld by the location server until after transmission of the at least a portion of the PRS resource may vary. Depending on desired functionality, this can include a scrambling ID, a frequency-domain parameter, a comb pattern, a OFDM symbol offset, a slot offset, or a combination thereof.

According to some embodiments, a value generator for different transmission parameters may be provided. For example, in embodiments in which multiple transmission parameter values that change with every symbol are withheld, providing this information can result in a large amount of overhead. To reduce overhead, the location server may simply provide a generator (e.g., a formula or algorithm) that the receiving UE can used to generate the unique values for the parameters for all symbols. Unlike the scrambling ID generator, however, the generator provided by the location server in this case may not be previously known. That is, the generator may be unique to a series of symbols used in a particular instance. That said, the generator may be selected from a number of predetermined generators, which may be predetermined and indexed, thereby saving even more overhead by enabling the location server to simply identify the generator(s) (e.g., by index number) to use for generating values for the various transmission parameters.

The way in which the one or more transmission parameter values are conveyed to a UE may vary, depending on desired functionality. The information may be carried, for example, using a Downlink Control Information (DCI) message or a MAC-CE message, which may be encrypted. According to some embodiments, the information may be provided using a broadcasted message, such as Physical Downlink Control Channel (PDCCH) (e.g., a group-common PDCCH) or a positioning System Information Block (posSIB). Additionally or alternatively, the information may be provided using an LTE Positioning Protocol (LPP) message or a Radio Resource Control (RRC) message. The information may come from the location server and may be relayed to a UE via the serving TRP of the UE. According to some embodiments, to allow for easier scheduling, the location server may provide the transmission parameter information to the TRP, and the TRP can determine when to relay the transmission parameter information to the UE.

The parameter transmission information could be transmitted as a regular data transmission, which may comprise a configured or a scheduled grant. This regular data transmission may be separate from the PRS resource itself, but may be sent periodically, which may correspond to the periodicity of PRS occasions, (e.g., every 160 ms).

Alternatively, the parameter information may be provided with a PRS resource (e.g., via Physical Downlink Shared Channel (PDSCH)). Examples of this type of parameter information transmission are described hereafter with respect to FIGS. 12A-12C.

Figure 12A:
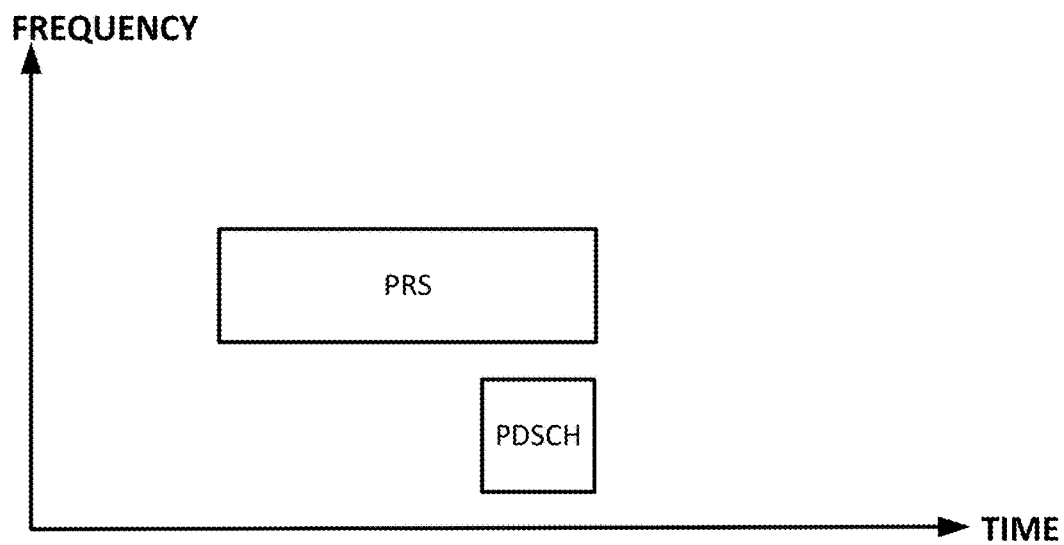
FIGS. 12A-12C are timing diagrams illustrating different options for conveying the one or more transmission parameter values, according to various embodiments.
Figure 12B:
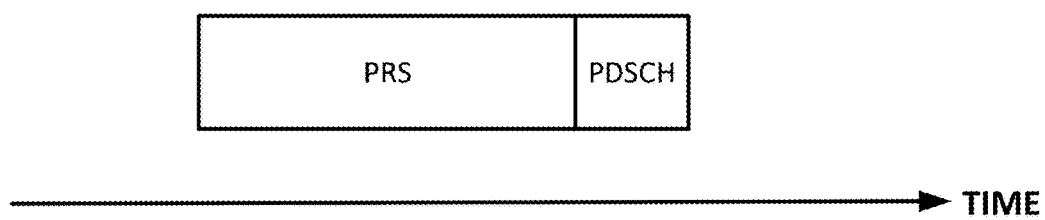
Figure 12C:
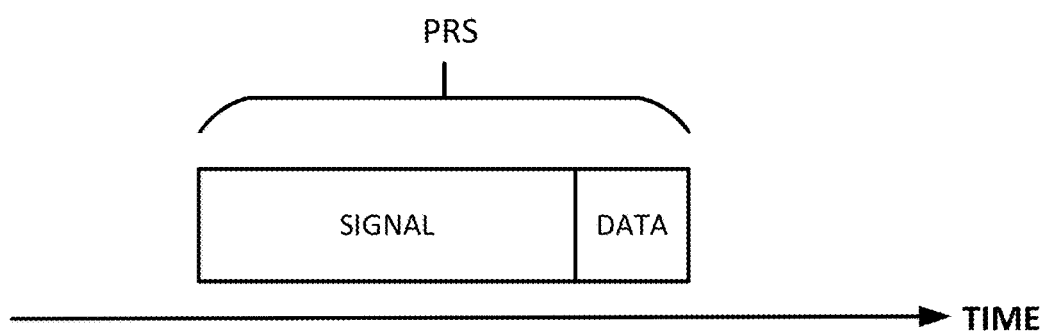

FIGS. 12A-12C are timing diagrams illustrating different options for conveying the one or more transmission parameter values, according to various embodiments.

FIG. 12A illustrates a first embodiment in which PRS information (a PRS occasion) is transmitted on a first frequency band, and transmission parameter information is transmitted in a PDSCH on a second frequency band. Here, the PDSCH overlaps partly with the PRS, such that a portion of the PRS (e.g., the last symbol of the PRS occasion) is transmitted concurrently with the PDSCH.

FIG. 12B illustrates a second embodiment, providing an alternative to the concurrent transmission approach of FIG. 12A. In particular, because it may not be desirable in certain circumstances to transmit a PDSCH on a separate frequency band, some embodiments may allow for transmitting the PDSCH with the transmission parameter information after the PRS. As illustrated, the information may be appended to the PRS (e.g., in the symbol immediately following the PRS). Additionally or alternatively, as previously noted, there may be some delay between the end of the PRS and the transmittal of the PDSCH. In cases where the information is appended to the PRS, the PDSCH may not technically be part of the PRS channel but could be part of a configured grant PDSCH appended to the PRS.

FIG. 12C illustrates a third embodiment. This embodiment is somewhat similar to the embodiment illustrated in FIG. 12B, where the transmission parameter information is appended to the PRS. However, unlike the embodiment in FIG. 12B the information is provided as part of the PRS itself, rather than a separate PD SCH. Thus, the information could be considered part of a data channel of the PRS, which may be separate than the signal channel of the PRS used for positioning.

Figure 13:
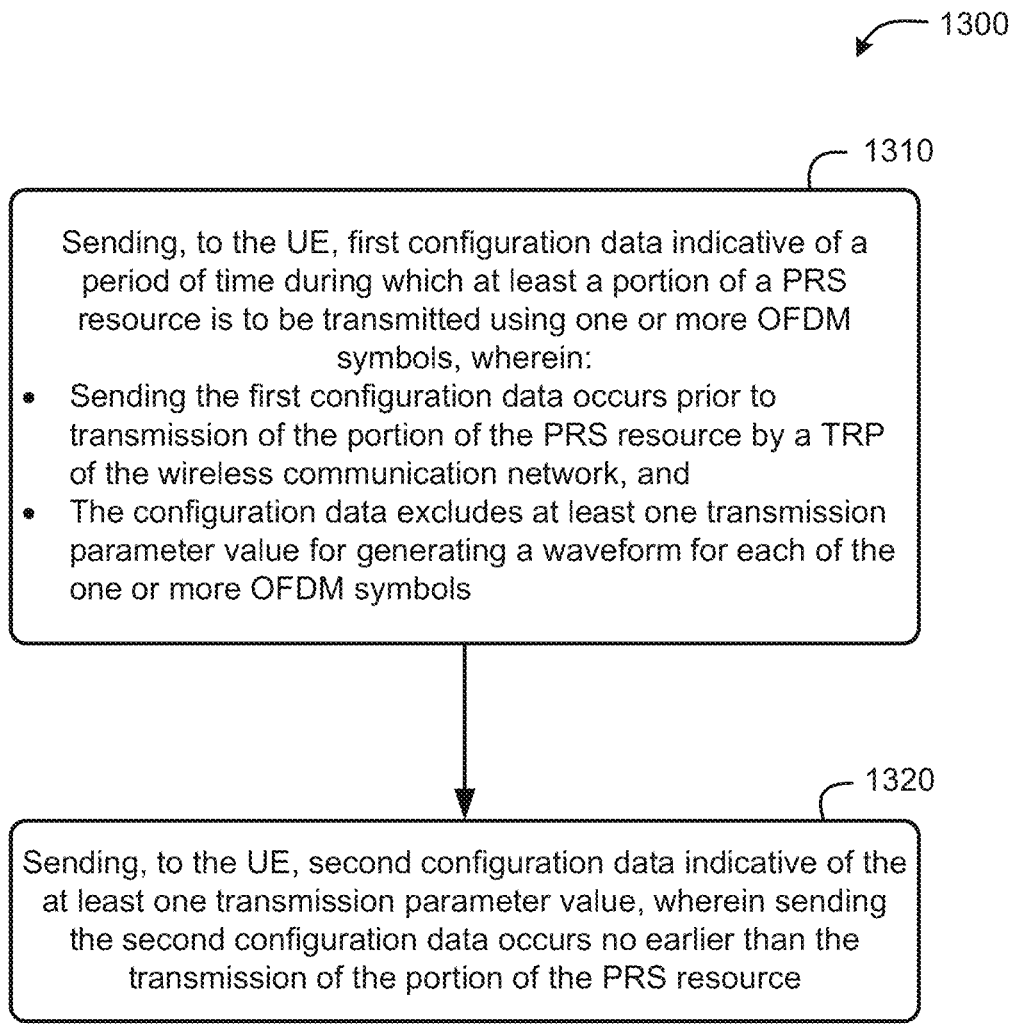
FIG. 13 is a flow diagram of a method of securing PRS resources for positioning of a UE in a wireless communication network, according to an embodiment.
Figure 16:
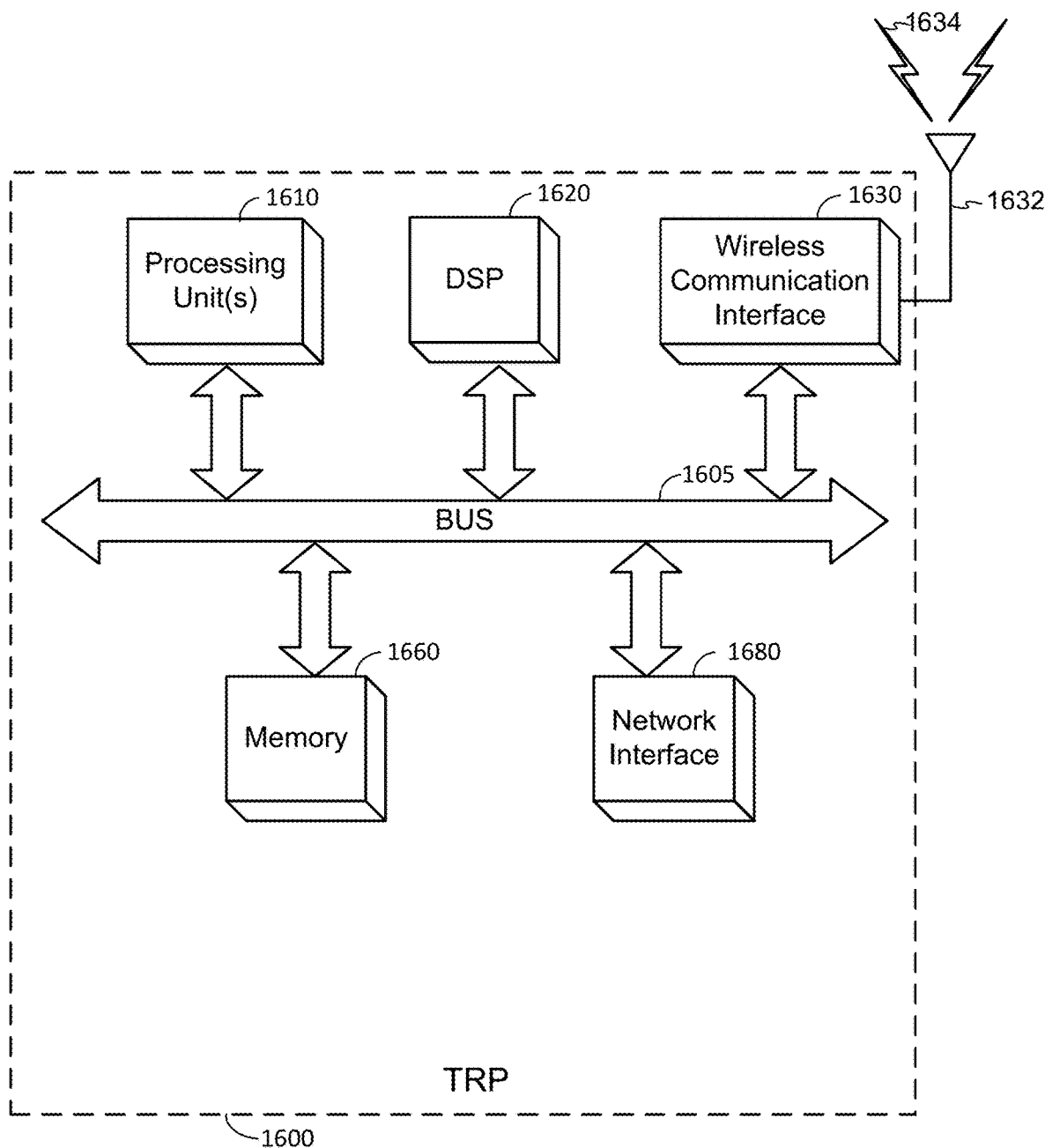
FIG. 16 is a block diagram of an embodiment of a Transmission Reception Point (TRP), which can be utilized in embodiments as described herein.

FIG. 13 is a flow diagram of a method 1300 of securing PRS resources for positioning of a UE in a wireless communication network, according to an embodiment. Means for performing the functionality illustrated in one or more of the blocks shown in FIG. 13 may be performed by hardware and/or software components of a network entity, such as a location server or serving TRP of the UE. Example components of a computer system that may comprise a location server are illustrated in FIG. 17, and example components of a TRP are illustrated in FIGS. 16, both of which are described in more detail below.

At block 1310, the functionality comprises sending, to the UE, first configuration data indicative of a period of time during which at least a portion of a PRS resource is to be transmitted using one or more OFDM symbols, where sending the first configuration data occurs prior to transmission of the portion of the PRS resource by a TRP of the wireless communication network, and the first configuration data excludes at least one transmission parameter value for generating a waveform for each of the one or more OFDM symbols. In some embodiments, the at least one OFDM symbol includes a plurality of OFDM symbols, and the at least one transmission parameter value comprises a unique transmission parameter value for each of the plurality of OFDM symbols. As noted, assistance data can be provided to a UE that omits at least one transmission parameter value for decoding the at least a portion of PRS resource. More particularly, assistance data can be provided to the UE prior to the transmission of at least a portion of the PRS resource to enable the UE to buffer relevant signal information for later processing once the at least one transmission parameter value is included. Again, embodiments may vary with regard to when they provide the omitted at least one transmission parameter value. According to some embodiments, for example, the one or more OFDM symbols are in the same OFDM slot or the same repetition of the PRS resource. The omitted at least one parameter value, too, may vary. Depending on desired functionality, the at least one transmission parameter value comprises a value of a scrambling ID, a frequency-domain parameter, a comb pattern, a OFDM symbol offset, a slot offset, or a combination thereof.

Additionally or alternatively, the first configuration data may include information regarding the timing of when the omitted at least one transmission parameter is to be provided. For example, according to some embodiments, the first configuration data includes an indication of a maximum time delay between the transmission of the at least the portion of the PRS resource and a time the second configuration data is received by the UE.

Figure 17:
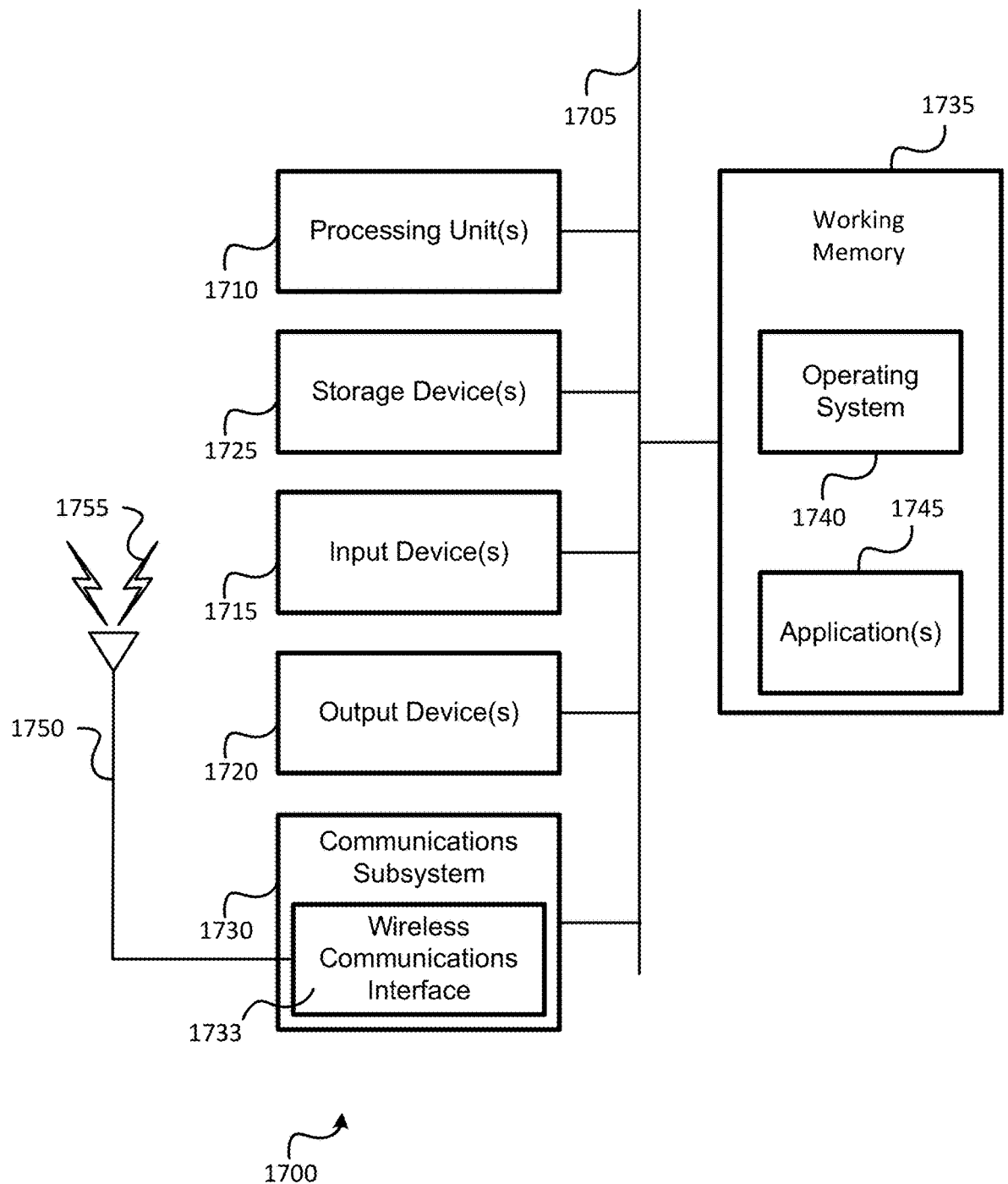
FIG. 17 is a block diagram of an embodiment of a computer system, which can be utilized in embodiments as described herein.

Means for performing functionality at block 1310 may comprise, for example, a bus 1705, processing unit(s) 1710, communications subsystem 1730, working memory 1735, and/or other components of a computer system 1700, as illustrated in FIG. 17. Alternatively, means for performing functionality at block 1310 may comprise, for example, a bus 1605, processing unit(s) 1610, digital signal processor (DSP) 1620, wireless communication interface 1630, memory 1660, and/or other components of a TRP 1600, as illustrated in FIG. 16.

At block 1320, the functionality comprises sending to the UE, second configuration data indicative of the at least one transmission parameter value. Here, sending the second configuration data occurs no earlier than the transmission of the portion of the PRS resource, and the second configuration data does not include information for generating a waveform for any OFDM symbol of a subsequent portion of the PRS resource, or any subsequent PRS resource in a PRS resource set of the PRS resource. As noted in the embodiments previously described, the second configuration data may be provided in a DCI message, a MAC-CE message, an LPP message, an RRC message, a group-common PDCCH message, a posSIB, or a combination thereof. Additionally or alternatively, the second configuration data comprises a secure sequence generator, which may be used to generate the at least one transmission parameter value. Sending the second configuration data may comprise sending the second configuration data on frequency separate from the PRS resource during a last OFDM symbol of the PRS resource, as noted in FIG. 12A. Additionally or alternatively, sending the second configuration data may comprise sending the second configuration data in a PDSCH at the end of the PRS resource or as embedded data at the end of the PRS resource, as indicated in FIGS. 12B and 12C.

Means for performing functionality at block 1320 may comprise, for example, a bus 1705, processing unit(s) 1710, communications subsystem 1730, working memory 1735, and/or other components of a computer system 1700, as illustrated in FIG. 17. Alternatively, means for performing functionality at block 1320 may comprise, for example, a bus 1605, processing unit(s) 1610, DSP 1620, wireless communication interface 1630, memory 1660, and/or other components of a TRP 1600, as illustrated in FIG. 16.

Figure 14:
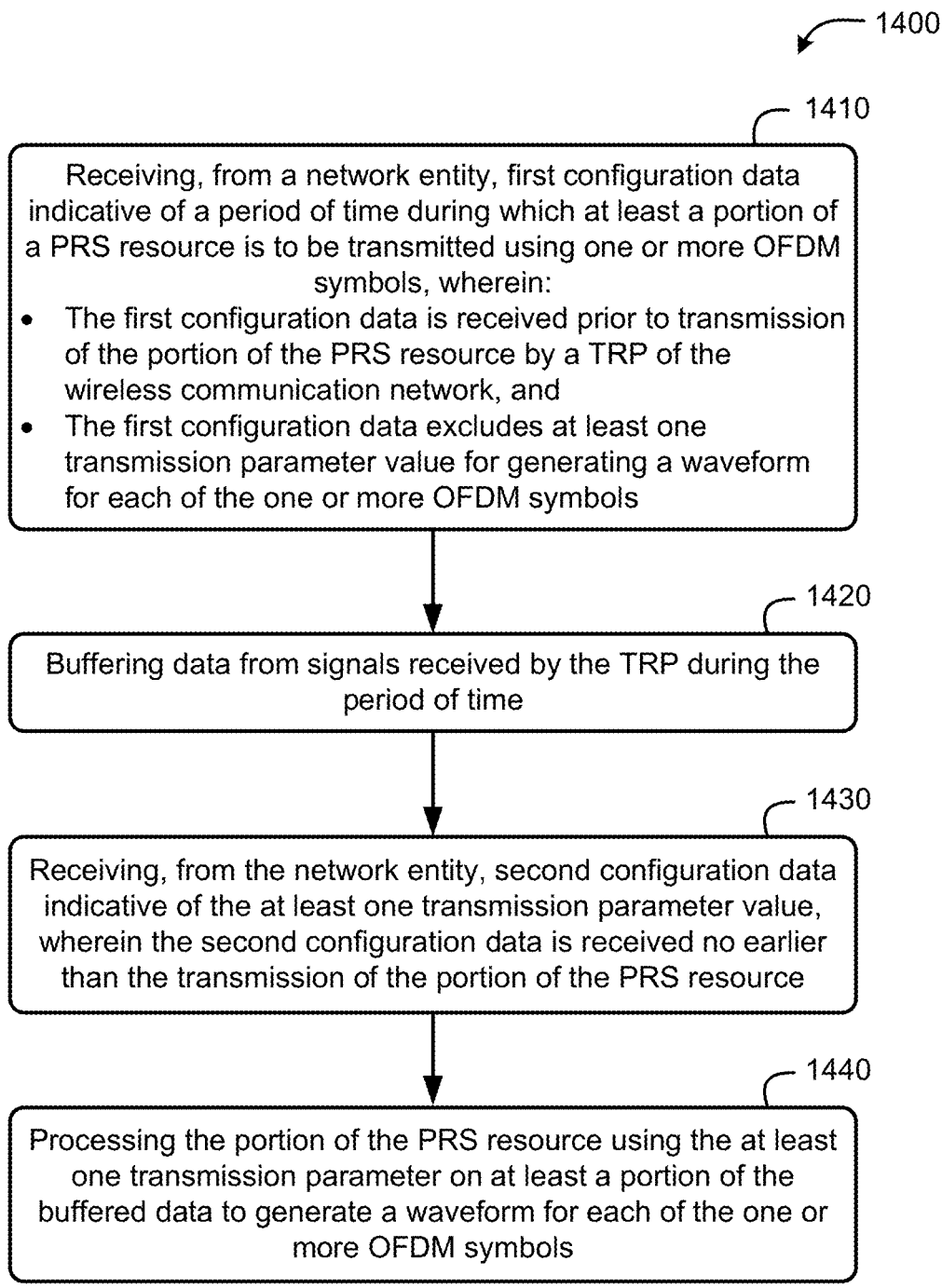
FIG. 14 is a flow diagram of a method of processing secured PRS resources for positioning of a UE in a wireless communication network, according to an embodiment.

FIG. 14 is a flow diagram of a method 1400 of processing secured PRS resources for positioning of a UE in a wireless communication network, according to an embodiment. Means for performing the functionality illustrated in one or more of the blocks shown in FIG. 14 may be performed by hardware and/or software components of a UE. Example components of a UE are illustrated in FIG. 15, which is described in more detail below.

At block 1410, the functionality comprises receiving, from a network entity, first configuration data indicative of a period of time during which at least a portion of a PRS resource is to be transmitted using a one or more OFDM symbols, wherein the first configuration data is received prior to transmission of the portion of the PRS resource by a TRP of the wireless communication network, the first configuration data excludes at least one transmission parameter value for generating a waveform for each of the one or more OFDM symbols. Again, in some embodiments, the at least one OFDM symbol includes a plurality of OFDM symbols, and the at least one transmission parameter value comprises a unique transmission parameter value for each of the plurality of OFDM symbols. Again, the one or more OFDM symbols may be in the same OFDM slot or the same repetition of the PRS resource. Additionally or alternatively, the at least one transmission parameter value may comprise a value of a scrambling ID, a frequency-domain parameter, a comb pattern, a OFDM symbol offset, a slot offset, or a combination thereof. The network entity may comprise a location server or a serving TRP of the UE. According to some embodiments, the first configuration data may include an indication of a maximum time delay between the transmission of the at least the portion of the PRS resource and a time the second configuration data is received by the UE.

Figure 15:
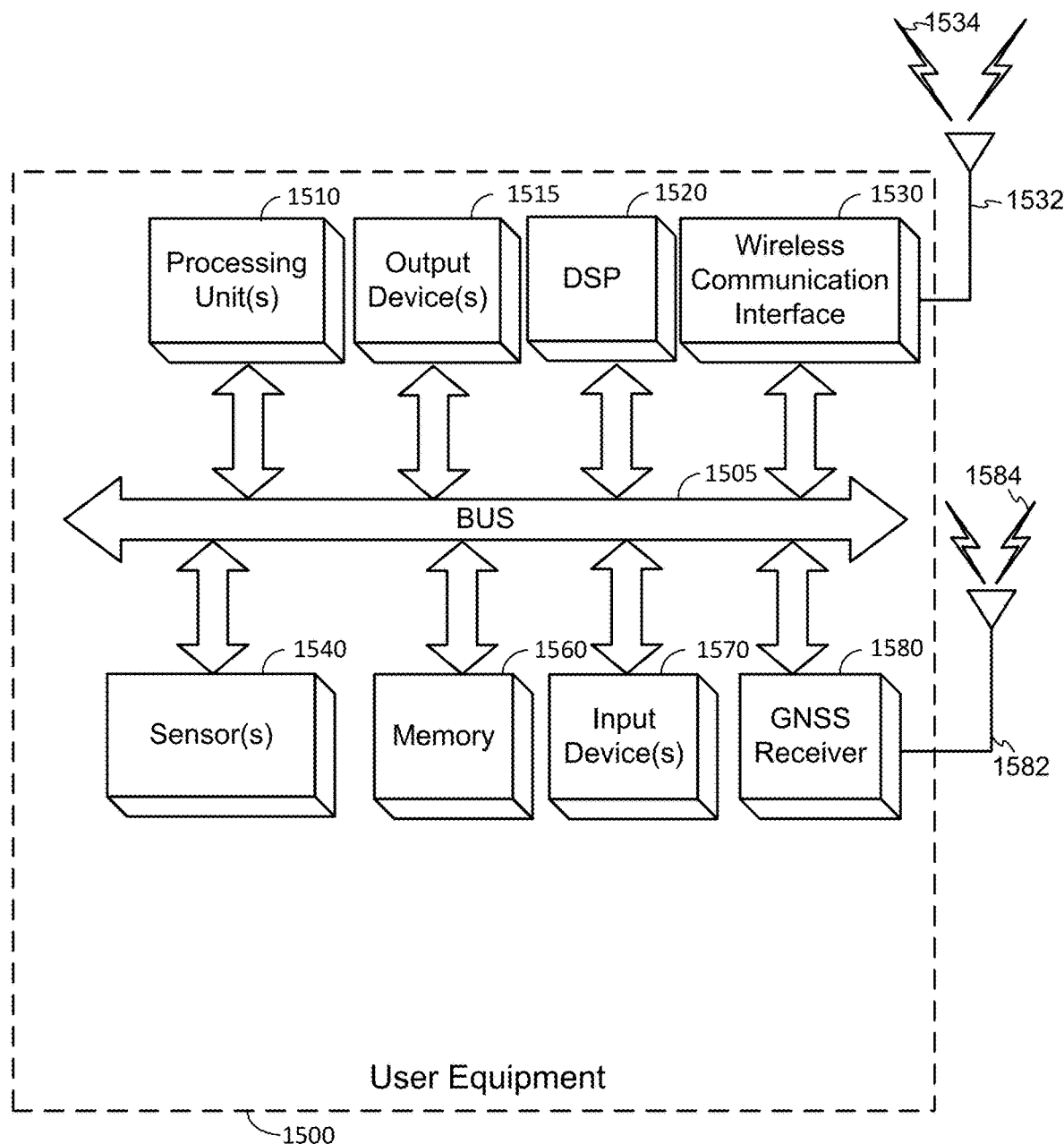
FIG. 15 is a block diagram of an embodiment of a UE, which can be utilized in embodiments as described herein.

Means for performing functionality at block 1410 may comprise, for example, a bus 1505, processing unit(s) 1510, DSP 1520, wireless communication interface 1530, memory 1560, and/or other components of a UE 1500, as illustrated in FIG. 15.

The functionality at block 1420 comprises buffering data from signals received by the TRP during the period of time. As noted, the buffering may be based on assistance data received by the location server or serving TRP, indicative of various parameters applicable to the buffering. These parameters can include, for example, periodicity and/or length of PRS occurrences, applicable frequency bands, frequency and/or timing offsets, symbols used for a PRS resource, etc.

Means for performing functionality at block 1420 may comprise, for example, a bus 1505, processing unit(s) 1510, DSP 1520, memory 1560, and/or other components of a UE 1500, as illustrated in FIG. 15.

At block 1430, the functionality comprises receiving, from the network entity, second configuration data indicative of the at least one transmission parameter value, wherein the second configuration data is received no earlier than the transmission of the at least a portion of the PRS resource. According to some embodiments, the second configuration data does not include information for generating a waveform for any OFDM symbol of a subsequent portion of the PRS resource or any subsequent PRS resource in a PRS resource set of the PRS resource. Again, the second configuration data may be provided in a DCI message, MAC-CE message, LPP message, RCC message, group-, and PDCCH message, posSIB, or a combination thereof. According to some embodiments, the second configuration data may comprise a secure sequence generator, in which case processing the portion of the PRS resource may further comprise, for each of the one or more OFDM symbols, using the secure sequence generator to generate the at least one transmission parameter value of the respective OFDM symbol. Again, second configuration data may be received in any of the manners indicated in FIG. 12A-12C, for example. Thus, according to some embodiments, receiving the second configuration data may comprise receiving the second configuration data on frequency separate from the PRS resource during a last OFDM symbol of the PRS resource. Additionally or alternatively, receiving the second configuration data comprises receiving the second configuration data in a PDSCH at the end of the PRS resource or as embedded data at the end of the PRS resource.

Means for performing functionality at block 1430 may comprise, for example, a bus 1505, processing unit(s) 1510, DSP 1520, wireless communication interface 1530, memory 1560, and/or other components of a UE 1500, as illustrated in FIG. 15.

At block 1440, the functionality comprises processing the portion of the PRS resource using the at least one transmission parameter value on at least a portion of the buffered data to generate a waveform for each of the one or more OFDM symbols. Means for performing functionality at block 1440 may comprise, for example, a bus 1505, processing unit(s) 1510, DSP 1520, memory 1560, and/or other components of a UE 1500, as illustrated in FIG. 15.

FIG. 15 illustrates an embodiment of a UE 1500, which can be utilized as described herein above. For example, the UE 1500 may correspond with UEs and/or mobile devices described in FIGS. 1-14 and can perform one or more of the functions of the method shown in FIG. 14. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices. Furthermore, as previously noted, the functionality of the UE discussed in the previously described embodiments may be executed by one or more of the hardware and/or software components illustrated in FIG. 15.

The UE 1500 is shown comprising hardware elements that can be electrically coupled via a bus 1505 (or may otherwise be in communication, as appropriate). The hardware elements may include a processing unit(s) 1510 which can include without limitation one or more general-purpose processors, one or more special-purpose processors (such as DSP chips, graphics acceleration processors, application specific integrated circuits (ASICs), and/or the like), and/or other processing structures or means. As shown in FIG. 15, some embodiments may have a separate DSP 1520, depending on desired functionality. Location determination and/or other determinations based on wireless communication may be provided in the processing unit(s) 1510 and/or wireless communication interface 1530 (discussed below). The UE 1500 also can include one or more input devices 1570, which can include without limitation one or more keyboards, touch screens, touch pads, microphones, buttons, dials, switches, and/or the like; and one or more output devices 1515, which can include without limitation one or more displays (e.g., touch screens), light emitting diodes (LEDs), speakers, and/or the like.

The UE 1500 may also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1500 to communicate with other devices as described in the embodiments above. The wireless communication interface 1530 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1532 that send and/or receive wireless signals 1534. According to some embodiments, the wireless communication antenna(s) 1532 may comprise a plurality of discrete antennas, antenna arrays, or any combination thereof. The antenna(s) 1532 may be capable of transmitting and receiving wireless signals using beams (e.g., Tx beams and Rx beams). Beam formation may be performed using digital and/or analog beam formation techniques, with respective digital and/or analog circuitry. The wireless communication interface 1530 may include such circuitry.

Depending on desired functionality, the wireless communication interface 1530 may comprise a separate receiver and transmitter, or any combination of transceivers, transmitters, and/or receivers to communicate with TRPs/base stations (e.g., ng-eNBs and gNBs) and other terrestrial transceivers, such as wireless devices and access points. The UE 1500 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 4" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1500 can further include sensor(s) 1540. Sensor(s) 1540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1500 may also include a Global Navigation Satellite System (GNSS) receiver 1580 capable of receiving signals 1584 from one or more GNSS satellites using an antenna 1582 (which could be the same as antenna 1532). Positioning based on GNSS signal measurement can be utilized to complement and/or incorporate the techniques described herein. The GNSS receiver 1580 can extract a position of the UE 1500, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1580 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1580 is illustrated in FIG. 15 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1510, DSP 1520, and/or a processing unit within the wireless communication interface 1530 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1510 or DSP 1520.

The UE 1500 may further include and/or be in communication with a memory 1560. The memory 1560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1560 of the UE 1500 also can comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1560 that are executable by the UE 1500 (and/or processing unit(s) 1510 or DSP 1520 within UE 1500). In an aspect, then such code and/or instructions can be used to configure and/or adapt a general-purpose computer (or other device) to perform one or more operations in accordance with the described methods.

FIG. 16 illustrates an embodiment of a TRP 1600, which can be utilized as described herein above. For example, the TRP 1600 may correspond with TRPs and/or base stations (e.g., gNBs, eNBs, ng-eNBs, etc.) previously described in reference to FIGS. 1-14 and can perform one or more of the functions of the method shown in FIG. 13. It should be noted that FIG. 16 is meant only to provide a generalized illustration of various components, any or all of which may be utilized as appropriate.

The TRP 1600 is shown comprising hardware elements that can be electrically coupled via a bus 1605 (or may otherwise be in communication, as appropriate). The hardware elements may include a processing unit(s) 1610 which can include without limitation one or more general-purpose processors, one or more special-purpose processors (such as DSP chips, graphics acceleration processors, ASICs, and/or the like), and/or other processing structure or means. As shown in FIG. 16, some embodiments may have a separate DSP 1620, depending on desired functionality. Location determination and/or other determinations based on wireless communication may be provided in the processing unit(s) 1610 and/or wireless communication interface 1630 (discussed below), according to some embodiments. The TRP 1600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1600 might also include a wireless communication interface 1630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1600 to communicate as described herein. The wireless communication interface 1630 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1632 that send and/or receive wireless signals 1634.

The TRP 1600 may also include a network interface 1680, which can include support of wireline communication technologies. The network interface 1680 may include a modem, network card, chipset, and/or the like. The network interface 1680 may include one or more input and/or output communication interfaces to permit data to be exchanged with a network, communication network servers, computer systems, and/or any other electronic devices described herein.

In many embodiments, the TRP 1600 may further comprise a memory 1660. The memory 1660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1660 of the TRP 1600 also may comprise software elements (not shown in FIG. 16), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1660 that are executable by the TRP 1600 (and/or processing unit(s) 1610 or DSP 1620 within TRP 1600). In an aspect, then such code and/or instructions can be used to configure and/or adapt a general-purpose computer (or other device) to perform one or more operations in accordance with the described methods.

FIG. 17 is a block diagram of an embodiment of a computer system 1700, which may be used, in whole or in part, to provide the functions of one or more network components as described in the embodiments herein, such as a location server. The computer system may therefore perform one or more of the functions of the method shown in FIG. 13. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner. In addition, it can be noted that components illustrated by FIG. 17 can be localized to a single device and/or distributed among various networked devices, which may be disposed at different geographical locations.

The computer system 1700 is shown comprising hardware elements that can be electrically coupled via a bus 1705 (or may otherwise be in communication, as appropriate). The hardware elements may include processing unit(s) 1710, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1700 also may comprise one or more input devices 1715, which may comprise without limitation a mouse, a keyboard, a camera, a microphone, and/or the like; and one or more output devices 1720, which may comprise without limitation a display device, a printer, and/or the like.

The computer system 1700 may further include (and/or be in communication with) one or more non-transitory storage devices 1725, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1700 may also include a communications subsystem 1730, which may comprise wireless communication technologies managed and controlled by a wireless communication interface 1733, as well as wired technologies (such as Ethernet, coaxial communications, universal serial bus (USB), and the like). The wireless communication interface 1733 may comprise one or more wireless transceivers may send and receive wireless signals 1755 (e.g., signals according to 5G NR or LTE) via wireless antenna(s) 1750. Thus the communications subsystem 1730 may comprise a modem, a network card (wireless or wired), an infrared communication device, a wireless communication device, and/or a chipset, and/or the like, which may enable the computer system 1700 to communicate on any or all of the communication networks described herein to any device on the respective network, including a User Equipment (UE), base stations and/or other TRPs, and/or any other electronic devices described herein. Hence, the communications subsystem 1730 may be used to receive and send data as described in the embodiments herein.

In many embodiments, the computer system 1700 will further comprise a working memory 1735, which may comprise a RAM or ROM device, as described above. Software elements, shown as being located within the working memory 1735, may comprise an operating system 1740, device drivers, executable libraries, and/or other code, such as one or more applications 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1725 described above. In some cases, the storage medium might be incorporated within a computer system, such as computer system 1700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data which causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of securing Positioning Reference Signals (PRS) resources for positioning of a user equipment (UE) in a wireless communication network, the method performed by a network entity and comprising: sending, to the UE, first configuration data indicative of a period of time during which at least a portion of a PRS resource is to be transmitted using one or more Orthogonal Frequency Division Multiplexing (OFDM) symbols, wherein: sending the first configuration data occurs prior to transmission of the portion of the PRS resource by a Transmission and Reception Point (TRP) of the wireless communication network; and the first configuration data excludes at least one transmission parameter value for generating a waveform for each of the one or more OFDM symbols; and sending, to the UE, second configuration data indicative of the at least one transmission parameter value, wherein sending the second configuration data occurs no earlier than the transmission of the portion of the PRS resource.

Clause 2. The method of clause 1, wherein the second configuration data does not include information for generating a waveform for: any OFDM symbol of a subsequent portion of the PRS resource, or any subsequent PRS resource in a PRS resource set of the PRS resource.

Clause 3. The method of any of clauses 1-2, wherein the one or more OFDM symbols include a plurality of OFDM symbols, and the at least one transmission parameter value comprises a unique transmission parameter value for each of the plurality of OFDM symbols.

Clause 4. The method of any of clauses 1-3, wherein the one or more OFDM symbols are in the same OFDM slot or the same repetition of the PRS resource.

Clause 5. The method of any of clauses 1-4, wherein the at least one transmission parameter value comprises a value of: a scrambling ID, a frequency-domain parameter, a comb pattern, a OFDM symbol offset, a slot offset, or a combination thereof.

Clause 6. The method of any of clauses 1-5, wherein sending the second configuration data comprises sending the second configuration data via: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 7. The method of any of clauses 1-6, wherein the network entity comprises a location server or a serving TRP of the UE.

Clause 8. The method of any of clauses 1-7, wherein the second configuration data comprises a secure sequence generator.

Clause 9. The method of any of clauses 1-8, wherein the first configuration data includes an indication of a maximum time delay between the transmission of the portion of the PRS resource and a time the second configuration data is received by the UE.

Clause 10. The method of any of clauses 1-9, wherein sending the second configuration data comprises sending the second configuration data on a frequency separate from the PRS resource during a last OFDM symbol of the PRS resource.

Clause 11. The method of any of clauses 1-9, wherein sending the second configuration data comprises sending the second configuration data in a Physical Downlink Shared Channel (PDSCH) at the end of the PRS resource or as embedded data at the end of the PRS resource.

Clause 12. A method of processing secured Positioning Reference Signals (PRS) resources for positioning of a user equipment (UE) in a wireless communication network, the method performed by the UE and comprising: receiving, from a network entity, first configuration data indicative of a period of time during which at least a portion of a PRS resource is to be transmitted using one or more Orthogonal Frequency Division Multiplexing (OFDM) symbols, wherein: the first configuration data is received prior to transmission of the portion of the PRS resource by a Transmission and Reception Point (TRP) of the wireless communication network; and the first configuration data excludes at least one transmission parameter value for generating a waveform for each of the one or more OFDM symbols; buffering data from signals received by the TRP during the period of time; receiving, from the network entity, second configuration data indicative of the at least one transmission parameter value, wherein the second configuration data is received no earlier than the transmission of the portion of the PRS resource; and processing the portion of the PRS resource using the at least one transmission parameter value on at least a portion of the buffered data to generate a waveform for each of the one or more OFDM symbols.

Clause 13. The method of clause 12, wherein the second configuration data does not include information for generating a waveform for: any OFDM symbol of a subsequent portion of the PRS resource, or any subsequent PRS resource in a PRS resource set of the PRS resource.

Clause 14. The method of any of clauses 12-13, wherein the one or more OFDM symbols include a plurality of OFDM symbols, and the at least one transmission parameter value comprises a unique transmission parameter value for each of the plurality of OFDM symbols.

Clause 15. The method of any of clauses 12-14, wherein the one or more OFDM symbols are in the same OFDM slot or the same repetition of the PRS resource.

Clause 16. The method of any of clauses 12-15, wherein the at least one transmission parameter value comprises a value of: a scrambling ID, a frequency-domain parameter, a comb pattern, a OFDM symbol offset, a slot offset, or a combination thereof.

Clause 17. The method of any of clauses 12-16, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 18. The method of any of clauses 12-17, wherein the network entity comprises a location server or a serving TRP of the UE.

Clause 19. The method of any of clauses 12-18, wherein the second configuration data comprises a secure sequence generator, and wherein processing the PRS resource further comprises, for each of the one or more OFDM symbols, using the secure sequence generator to generate the at least one transmission parameter value of the respective OFDM symbol.

Clause 20. The method of any of clauses 12-19, wherein the first configuration data includes an indication of a maximum time delay between the transmission of the at least the portion of the PRS resource and a time the second configuration data is received by the UE.

Clause 21. The method of any of clauses 12-20, wherein receiving the second configuration data comprises receiving the second configuration data on a frequency separate from the PRS resource during a last OFDM symbol of the PRS resource.

Clause 22. The method of any of clauses 12-20, wherein receiving the second configuration data comprises receiving the second configuration data in a Physical Downlink Shared Channel (PDSCH) at the end of the PRS resource or as embedded data at the end of the PRS resource.

Clause 23. A network entity for securing Positioning Reference Signals (PRS) resources for positioning of a user equipment (UE) in a wireless communication network, the network entity comprising: a transceiver; a memory; and one or more processing units communicatively coupled to the transceiver and the memory, wherein the one or more processing units are configured to: send, to the UE via the transceiver, first configuration data indicative of a period of time during which at least a portion of a PRS resource is to be transmitted using one or more Orthogonal Frequency Division Multiplexing (OFDM) symbols, wherein: the one or more processing units are configured to send the first configuration data occurs prior to transmission of the portion of the PRS resource by a Transmission and Reception Point (TRP) of the wireless communication network; and the one or more processing units are configured to exclude, from the first configuration data, at least one transmission parameter value for generating a waveform for each of the one or more OFDM symbols; and send, to the UE via the transceiver, second configuration data indicative of the at least one transmission parameter value, wherein sending the second configuration data occurs no earlier than the transmission of the portion of the PRS resource.

Clause 24. The network entity of clause 23, wherein the one or more processing units are configured to send the second configuration data such that the second configuration data does not include information for generating a waveform for: any OFDM symbol of a subsequent portion of the PRS resource, or any subsequent PRS resource in a PRS resource set of the PRS resource.

Clause 25. The network entity of any of clauses 23-24, wherein the one or more OFDM symbols include a plurality of OFDM symbols, and the at least one transmission parameter value comprises a unique transmission parameter value for each of the plurality of OFDM symbols.

Clause 26. The network entity of any of clauses 23-25, wherein the one or more OFDM symbols are in the same OFDM slot or the same repetition of the PRS resource.

Clause 27. The network entity of any of clauses 23-26, wherein the at least one transmission parameter value comprises a value of: a scrambling ID, a frequency-domain parameter, a comb pattern, a OFDM symbol offset, a slot offset, or a combination thereof.

Clause 28. The network entity of any of clauses 23-27, wherein the one or more processing units are configured to send the second configuration data via: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 29. The network entity of any of clauses 23-28, wherein the network entity comprises a location server or a serving TRP of the UE.

Clause 30. The network entity of any of clauses 23-29, wherein the one or more processing units are configured to include, in the second configuration data, a secure sequence generator.

Clause 31. The network entity of any of clauses 23-30, wherein the one or more processing units are configured to include, in the first configuration data, an indication of a maximum time delay between the transmission of the portion of the PRS resource and a time the second configuration data is received by the UE.

Clause 32. The network entity of any of clauses 23-31, wherein the one or more processing units are configured to send the second configuration data on a frequency separate from the PRS resource during a last OFDM symbol of the PRS resource.

Clause 33. The network entity of any of clauses 23-31, wherein the one or more processing units are configured to send the second configuration data in a Physical Downlink Shared Channel (PDSCH) at the end of the PRS resource or as embedded data at the end of the PRS resource.

Clause 34. A user equipment (UE) for processing secured Positioning Reference Signals (PRS) resources for positioning of the UE in a wireless communication network, comprising: a transceiver; a memory; and one or more processing units communicatively coupled to the transceiver and the memory, wherein the one or more processing units are configured to: receive, from a network entity via the transceiver, first configuration data indicative of a period of time during which at least a portion of a PRS resource is to be transmitted using one or more Orthogonal Frequency Division Multiplexing (OFDM) symbols, wherein: the first configuration data is received prior to transmission of the portion of the PRS resource by a Transmission and Reception Point (TRP) of the wireless communication network; and the first configuration data excludes at least one transmission parameter value for generating a waveform for each of the one or more OFDM symbols; buffer data from signals received by the TRP during the period of time; receive, from a network entity via the transceiver, second configuration data indicative of the at least one transmission parameter value, wherein the second configuration data is received no earlier than the transmission of the portion of the PRS resource; and process the portion of the PRS resource using the at least one transmission parameter value on at least a portion of the buffered data to generate a waveform for each of the one or more OFDM symbols.

Clause 35. The UE of clause 34, wherein the second configuration data does not include information for generating a waveform for: any OFDM symbol of a subsequent portion of the PRS resource, or any subsequent PRS resource in a PRS resource set of the PRS resource.

Clause 36. The UE of any of clauses 34-35, wherein the one or more OFDM symbols include a plurality of OFDM symbols, and the at least one transmission parameter value comprises a unique transmission parameter value for each of the plurality of OFDM symbols.

Clause 37. The UE of any of clauses 34-36, wherein the one or more OFDM symbols are in the same OFDM slot or the same repetition of the PRS resource.

Clause 38. The UE of any of clauses 34-37, wherein the at least one transmission parameter value comprises a value of: a scrambling ID, a frequency-domain parameter, a comb pattern, a OFDM symbol offset, a slot offset, or a combination thereof.

Clause 39. The UE of any of clauses 34-38, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 40. The UE of any of clauses 34-39, wherein the network entity comprises a location server or a serving TRP of the UE.

Clause 41. The UE of any of clauses 34-40, wherein the second configuration data comprises a secure sequence generator, and wherein, to process the PRS resource, the one or more processing units are configured to, for each of the one or more OFDM symbols, use the secure sequence generator to generate the at least one transmission parameter value of the respective OFDM symbol.

Clause 42. The UE of any of clauses 34-41, wherein the first configuration data includes an indication of a maximum time delay between the transmission of the at least the portion of the PRS resource and a time the second configuration data is received by the UE.

Clause 43. The UE of any of clauses 34-42, wherein the one or more processing units are configured to receive the second configuration data on a frequency separate from the PRS resource during a last OFDM symbol of the PRS resource.

Clause 44. The UE of any of clauses 34-42, wherein the one or more processing units are configured to receive the second configuration data in a Physical Downlink Shared Channel (PDSCH) at the end of the PRS resource or as embedded data at the end of the PRS resource.

Clause 45. An apparatus for securing Positioning Reference Signals (PRS) resources for positioning of a user equipment (UE) in a wireless communication network, comprising: means for sending, to the UE, first configuration data indicative of a period of time during which at least a portion of a PRS resource is to be transmitted using one or more Orthogonal Frequency Division Multiplexing (OFDM) symbols, wherein: sending the first configuration data occurs prior to transmission of the portion of the PRS resource by a Transmission and Reception Point (TRP) of the wireless communication network; and the configuration first data excludes at least one transmission parameter value for generating a waveform for each of the one or more OFDM symbols; and means for sending, to the UE, second configuration data indicative of the at least one transmission parameter value, wherein sending the second configuration data occurs no earlier than the transmission of the portion of the PRS resource.

Clause 46. The apparatus of clause 45, wherein the second configuration data does not include information for generating a waveform for: any OFDM symbol of a subsequent portion of the PRS resource, or any subsequent PRS resource in a PRS resource set of the PRS resource.

Clause 47. The apparatus of any of clauses 45-46, wherein the one or more OFDM symbols include a plurality of OFDM symbols, and the at least one transmission parameter value comprises a unique transmission parameter value for each of the plurality of OFDM symbols.

Clause 48. The apparatus of any of clauses 45-47, wherein the one or more OFDM symbols are in the same OFDM slot or the same repetition of the PRS resource.

Clause 49. The apparatus of any of clauses 45-48, wherein the at least one transmission parameter value comprises a value of: a scrambling ID, a frequency-domain parameter, a comb pattern, a OFDM symbol offset, a slot offset, or a combination thereof.

Clause 50. The apparatus of any of clauses 45-49, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 51. The apparatus of any of clauses 45-50, wherein the network entity comprises a location server or a serving TRP of the UE.

Clause 52. The apparatus of any of clauses 45-51, wherein the second configuration data comprises a secure sequence generator.

Clause 53. The apparatus of any of clauses 45-52, wherein the first configuration data includes an indication of a maximum time delay between the transmission of the portion of the PRS resource and a time the second configuration data is received by the UE.

Clause 54. The apparatus of any of clauses 45-53, wherein the means for sending the second configuration data comprises means for sending the second configuration data on a frequency separate from the PRS resource during a last OFDM symbol of the PRS resource.

Clause 55. The apparatus of any of clauses 45-53, wherein the means for sending the second configuration data comprises means for sending the second configuration data in a Physical Downlink Shared Channel (PDSCH) at the end of the PRS resource or as embedded data at the end of the PRS resource.

Clause 56. An apparatus for processing secured Positioning Reference Signals (PRS) resources for positioning of a user equipment (UE) in a wireless communication network, comprising: means for receiving, from a network entity, first configuration data indicative of a period of time during which at least a portion of a PRS resource is to be transmitted using one or more Orthogonal Frequency Division Multiplexing (OFDM) symbols, wherein: the first configuration data is received prior to transmission of the portion of the PRS resource by a Transmission and Reception Point (TRP) of the wireless communication network; and the first configuration data excludes at least one transmission parameter value for generating a waveform for each of the one or more OFDM symbols; means for buffering data from signals received by the TRP during the period of time; means for receiving, from the network entity, second configuration data indicative of the at least one transmission parameter value, wherein the second configuration data is received no earlier than the transmission of the portion of the PRS resource; and means for processing the portion of the PRS resource, wherein the processing comprises using the at least one transmission parameter value on at least a portion of the buffered data to generate a waveform for each of the one or more OFDM symbols.

Clause 57. The apparatus of clause 56, wherein the second configuration data does not include information for generating a waveform for: any OFDM symbol of a subsequent portion of the PRS resource, or any subsequent PRS resource in a PRS resource set of the PRS resource.

Clause 58. The apparatus of any of clauses 56-57, wherein the one or more OFDM symbols include a plurality of OFDM symbols, and the at least one transmission parameter value comprises a unique transmission parameter value for each of the plurality of OFDM symbols.

Clause 59. The apparatus of any of clauses 56-58, wherein the one or more OFDM symbols are in the same OFDM slot or the same repetition of the PRS resource.

Clause 60. The apparatus of any of clauses 56-59, wherein the at least one transmission parameter value comprises a value of: a scrambling ID, a frequency-domain parameter, a comb pattern, a OFDM symbol offset, a slot offset, or a combination thereof.

Clause 61. The apparatus of any of clauses 56-60, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 62. The apparatus of any of clauses 56-61, wherein the network entity comprises a location server or a serving TRP of the UE.

Clause 63. The apparatus of any of clauses 56-62, wherein the second configuration data comprises a secure sequence generator, and wherein the means for processing the PRS resource further comprises means for using, for each of the one or more OFDM symbols, the secure sequence generator to generate the at least one transmission parameter value of the respective OFDM symbol.

Clause 64. The apparatus of any of clauses 56-63, wherein the first configuration data includes an indication of a maximum time delay between the transmission of the at least the portion of the PRS resource and a time the second configuration data is received by the UE.

Clause 65. The apparatus of any of clauses 56-64, wherein the means for receiving the second configuration data comprises means for receiving the second configuration data on a frequency separate from the PRS resource during a last OFDM symbol of the PRS resource.

Clause 66. The apparatus of any of clauses 56-64, wherein the means for receiving the second configuration data comprises means for receiving the second configuration data in a Physical Downlink Shared Channel (PDSCH) at the end of the PRS resource or as embedded data at the end of the PRS resource.

Clause 67. A non-transitory computer-readable medium storing a set of instructions for securing Positioning Reference Signals (PRS) resources for positioning of a user equipment (UE) in a wireless communication network, wherein the set of instructions comprises code for: sending, to the UE, first configuration data indicative of a period of time during which at least a portion of a PRS resource is to be transmitted using one or more Orthogonal Frequency Division Multiplexing (OFDM) symbols, wherein: sending the first configuration data occurs prior to transmission of the portion of the PRS resource by a Transmission and Reception Point (TRP) of the wireless communication network; and the first configuration data excludes at least one transmission parameter value for generating a waveform for each of the one or more OFDM symbols; and sending, to the UE, second configuration data indicative of the at least one transmission parameter value, wherein sending the second configuration data occurs no earlier than the transmission of the portion of the PRS resource.

Clause 68. The non-transitory computer-readable medium of clause 67, wherein the second configuration data does not include information for generating a waveform for: any OFDM symbol of a subsequent portion of the PRS resource, or any subsequent PRS resource in a PRS resource set of the PRS resource.

Clause 69. The non-transitory computer-readable medium of any of clauses 67-68, wherein the one or more OFDM symbols include a plurality of OFDM symbols, and the at least one transmission parameter value comprises a unique transmission parameter value for each of the plurality of OFDM symbols.

Clause 70. The non-transitory computer-readable medium of any of clauses 67-69, wherein the one or more OFDM symbols are in the same OFDM slot or the same repetition of the PRS resource.

Clause 71. The non-transitory computer-readable medium of any of clauses 67-70, wherein the at least one transmission parameter value comprises a value of: a scrambling ID, a frequency-domain parameter, a comb pattern, a OFDM symbol offset, a slot offset, or a combination thereof.

Clause 72. The non-transitory computer-readable medium of any of clauses 67-71, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 73. The non-transitory computer-readable medium of any of clauses 67-72, wherein the network entity comprises a location server or a serving TRP of the UE.

Clause 74. The non-transitory computer-readable medium of any of clauses 67-73, wherein the second configuration data comprises a secure sequence generator.

Clause 75. The non-transitory computer-readable medium of any of clauses 67-74, wherein the first configuration data includes an indication of a maximum time delay between the transmission of the portion of the PRS resource and a time the second configuration data is received by the UE.

Clause 76. The non-transitory computer-readable medium of any of clauses 67-75, wherein the code for sending the second configuration data comprises code for the second configuration data on a frequency separate from the PRS resource during a last OFDM symbol of the PRS resource.

Clause 77. The non-transitory computer-readable medium of any of clauses 67-75, wherein the code for sending the second configuration data comprises code for sending the second configuration data in a Physical Downlink Shared Channel (PDSCH) at the end of the PRS resource or as embedded data at the end of the PRS resource.

Clause 78. A non-transitory computer-readable medium storing a set of instructions for processing secured Positioning Reference Signals (PRS) resources for positioning of a user equipment (UE) in a wireless communication network, wherein the set of instructions comprises code for: receiving, from a network entity, first configuration data indicative of a period of time during which at least a portion of a PRS resource is to be transmitted using one or more Orthogonal Frequency Division Multiplexing (OFDM) symbols, wherein: the first configuration data is received prior to transmission of the portion of the PRS resource by a Transmission and Reception Point (TRP) of the wireless communication network; and the first configuration data excludes at least one transmission parameter value for generating a waveform for each of the one or more OFDM symbols; buffering data from signals received by the TRP during the period of time; receiving, from the network entity, second configuration data indicative of the at least one transmission parameter value, wherein the second configuration data is received no earlier than the transmission of the portion of the PRS resource; and processing the portion of the PRS resource, wherein the processing comprises using the at least one transmission parameter value on at least a portion of the buffered data to generate a waveform for each of the one or more OFDM symbols.

Clause 79. The non-transitory computer-readable medium of clause 78, wherein the second configuration data does not include information for generating a waveform for: any OFDM symbol of a subsequent portion of the PRS resource, or any subsequent PRS resource in a PRS resource set of the PRS resource.

Clause 80. The non-transitory computer-readable medium of any of clauses 78-79, wherein the one or more OFDM symbols include plurality of OFDM symbols, and the at least one transmission parameter value comprises a unique transmission parameter value for each of the plurality of OFDM symbols.

Clause 81. The non-transitory computer-readable medium of any of clauses 78-80, wherein the one or more OFDM symbols are in the same OFDM slot or the same repetition of the PRS resource.

Clause 82. The non-transitory computer-readable medium of any of clauses 78-81, wherein the at least one transmission parameter value comprises a value of: a scrambling ID, a frequency-domain parameter, a comb pattern, a OFDM symbol offset, a slot offset, or a combination thereof.

Clause 83. The non-transitory computer-readable medium of any of clauses 78-82, wherein the second configuration data is provided in: a Downlink Control Information (DCI) message, a Media Access Control-Control Element (MAC-CE) message, an LTE Positioning Protocol (LPP) message, a Radio Resource Control (RRC) message, a group-common Physical Downlink Control Channel (PDCCH) message, a positioning System Information Block (posSIB), or a combination thereof.

Clause 84. The non-transitory computer-readable medium of any of clauses 78-83, wherein the network entity comprises a location server or a serving TRP of the UE.

Clause 85. The non-transitory computer-readable medium of any of clauses 78-84, wherein the second configuration data comprises a secure sequence generator, and wherein processing the PRS resource further comprises, for each of the one or more OFDM symbols, using the secure sequence generator to generate the at least one transmission parameter value of the respective OFDM symbol.

Clause 86. The non-transitory computer-readable medium of any of clauses 78-85, wherein the first configuration data includes an indication of a maximum time delay between the transmission of the at least the portion of the PRS resource and a time the second configuration data is received by the UE.

Clause 87. The non-transitory computer-readable medium of any of clauses 78-86, wherein the code for receiving the second configuration data comprise code for receiving the second configuration data on a frequency separate from the PRS resource during a last OFDM symbol of the PRS resource.

Clause 88. The non-transitory computer-readable medium of any of clauses 78-86, wherein the code for receiving the second configuration data comprise code for receiving the second configuration data in a Physical Downlink Shared Channel (PDSCH) at the end of the PRS resource or as embedded data at the end of the PRS resource.

What is claimed is:

1. A method of securing Positioning Reference Signals (PRS) resources for positioning of a user equipment (UE) in a wireless communication network, the method performed by a network entity and comprising:
sending, to the UE, first configuration data indicative of a period of time during which at least a portion of a PRS resource is to be transmitted using one or more Orthogonal Frequency Division Multiplexing (OFDM) symbols, wherein:
sending the first configuration data occurs prior to transmission of the portion of the PRS resource by a Transmission and Reception Point (TRP) of the wireless communication network; and
the first configuration data excludes at least one transmission parameter value for generating a waveform for each of the one or more OFDM symbols; and
sending, to the UE, second configuration data indicative of the at least one transmission parameter value, wherein sending the second configuration data occurs no earlier than the transmission of the portion of the PRS resource.

2. The method of claim 1, wherein the second configuration data does not include information for generating a waveform for:
any OFDM symbol of a subsequent portion of the PRS resource, or
any subsequent PRS resource in a PRS resource set of the PRS resource.

3. The method of claim 1, wherein the one or more OFDM symbols include a plurality of OFDM symbols, and the at least one transmission parameter value comprises a unique transmission parameter value for each of the plurality of OFDM symbols.

4. The method of claim 1, wherein the one or more OFDM symbols are in the same OFDM slot or the same repetition of the PRS resource.

5. The method of claim 1, wherein the at least one transmission parameter value comprises a value of:
a scrambling ID,
a frequency-domain parameter,
a comb pattern,
a OFDM symbol offset,
a slot offset, or
a combination thereof.

6. The method of claim 1, wherein sending the second configuration data comprises sending the second configuration data via:
a Downlink Control Information (DCI) message,
a Media Access Control-Control Element (MAC-CE) message,
an LTE Positioning Protocol (LPP) message,
a Radio Resource Control (RRC) message,
a group-common Physical Downlink Control Channel (PDCCH) message,
a positioning System Information Block (posSIB), or
a combination thereof.

7. The method of claim 1, wherein the network entity comprises a location server or a serving TRP of the UE.

8. The method of claim 1, wherein the second configuration data comprises a secure sequence generator.

9. The method of claim 1, wherein the first configuration data includes an indication of a maximum time delay between the transmission of the portion of the PRS resource and a time the second configuration data is received by the UE.

10. The method of claim 1, wherein sending the second configuration data comprises sending the second configuration data on a frequency separate from the PRS resource during a last OFDM symbol of the PRS resource.

11. The method of claim 1, wherein sending the second configuration data comprises sending the second configuration data in a Physical Downlink Shared Channel (PDSCH) at the end of the PRS resource or as embedded data at the end of the PRS resource.

12. A method of processing secured Positioning Reference Signals (PRS) resources for positioning of a user equipment (UE) in a wireless communication network, the method performed by the UE and comprising:
receiving, from a network entity, first configuration data indicative of a period of time during which at least a portion of a PRS resource is to be transmitted using one or more Orthogonal Frequency Division Multiplexing (OFDM) symbols, wherein:
the first configuration data is received prior to transmission of the portion of the PRS resource by a Transmission and Reception Point (TRP) of the wireless communication network; and
the first configuration data excludes at least one transmission parameter value for generating a waveform for each of the one or more OFDM symbols;
buffering data from signals received by the TRP during the period of time;
receiving, from the network entity, second configuration data indicative of the at least one transmission parameter value, wherein the second configuration data is received no earlier than the transmission of the portion of the PRS resource; and
processing the portion of the PRS resource using the at least one transmission parameter value on at least a portion of the buffered data to generate a waveform for each of the one or more OFDM symbols.

13. The method of claim 12, wherein the second configuration data does not include information for generating a waveform for:
any OFDM symbol of a subsequent portion of the PRS resource, or
any subsequent PRS resource in a PRS resource set of the PRS resource.

14. The method of claim 12, wherein the one or more OFDM symbols include a plurality of OFDM symbols, and the at least one transmission parameter value comprises a unique transmission parameter value for each of the plurality of OFDM symbols.

15. The method of claim 12, wherein the one or more OFDM symbols are in the same OFDM slot or the same repetition of the PRS resource.

16. The method of claim 12, wherein the at least one transmission parameter value comprises a value of:
a scrambling ID,
a frequency-domain parameter,
message,
a comb pattern,
a OFDM symbol offset,
a slot offset, or
a combination thereof.

17. The method of claim 12, wherein the second configuration data is provided in:
a Downlink Control Information (DCI) message,
a Media Access Control-Control Element (MAC-CE) message,
an LTE Positioning Protocol (LPP) message,
a Radio Resource Control (RRC) message,
a group-common Physical Downlink Control Channel (PDCCH) message,
a positioning System Information Block (posSIB), or
a combination thereof.

18. The method of claim 12, wherein the network entity comprises a location server or a serving TRP of the UE.

19. The method of claim 12, wherein the second configuration data comprises a secure sequence generator, and wherein processing the PRS resource further comprises, for each of the one or more OFDM symbols, using the secure sequence generator to generate the at least one transmission parameter value of the respective OFDM symbol.

20. The method of claim 12, wherein the first configuration data includes an indication of a maximum time delay between the transmission of the at least the portion of the PRS resource and a time the second configuration data is received by the UE.

21. The method of claim 12, wherein receiving the second configuration data comprises receiving the second configuration data on a frequency separate from the PRS resource during a last OFDM symbol of the PRS resource.

22. The method of claim 12, wherein receiving the second configuration data comprises receiving the second configuration data in a Physical Downlink Shared Channel (PDSCH) at the end of the PRS resource or as embedded data at the end of the PRS resource.

23. A network entity for securing Positioning Reference Signals (PRS) resources for positioning of a user equipment (UE) in a wireless communication network, the network entity comprising:
a transceiver;
a memory; and
one or more processing units communicatively coupled to the transceiver and the memory, wherein the one or more processing units are configured to:
send, to the UE via the transceiver, first configuration data indicative of a period of time during which at least a portion of a PRS resource is to be transmitted using one or more Orthogonal Frequency Division Multiplexing (OFDM) symbols, wherein:
the one or more processing units are configured to send the first configuration data occurs prior to transmission of the portion of the PRS resource by a Transmission and Reception Point (TRP) of the wireless communication network; and
the one or more processing units are configured to exclude, from the first configuration data, at least one transmission parameter value for generating a waveform for each of the one or more OFDM symbols; and
send, to the UE via the transceiver, second configuration data indicative of the at least one transmission parameter value, wherein sending the second configuration data occurs no earlier than the transmission of the portion of the PRS resource.

24. The network entity of claim 23, wherein the one or more processing units are configured to send the second configuration data such that the second configuration data does not include information for generating a waveform for:
any OFDM symbol of a subsequent portion of the PRS resource, or
any subsequent PRS resource in a PRS resource set of the PRS resource.

25. The network entity of claim 23, wherein the one or more OFDM symbols include a plurality of OFDM symbols, and the at least one transmission parameter value comprises a unique transmission parameter value for each of the plurality of OFDM symbols.

26. The network entity of claim 23, wherein the one or more OFDM symbols are in the same OFDM slot or the same repetition of the PRS resource.

27. The network entity of claim 23, wherein the at least one transmission parameter value comprises a value of:
a scrambling ID,
a frequency-domain parameter,
a comb pattern,
a OFDM symbol offset,
a slot offset, or
a combination thereof.

28. The network entity of claim 23, wherein the one or more processing units are configured to send the second configuration data via:
a Downlink Control Information (DCI) message,
a Media Access Control-Control Element (MAC-CE) message,
an LTE Positioning Protocol (LPP) message,
a Radio Resource Control (RRC) message,
a group-common Physical Downlink Control Channel (PDCCH) message,
a positioning System Information Block (posSIB), or
a combination thereof.

29. The network entity of claim 23, wherein the network entity comprises a location server or a serving TRP of the UE.

30. The network entity of claim 23, wherein the one or more processing units are configured to include, in the second configuration data, a secure sequence generator.

31. The network entity of claim 23, wherein the one or more processing units are configured to include, in the first configuration data, an indication of a maximum time delay between the transmission of the portion of the PRS resource and a time the second configuration data is received by the UE.

32. The network entity of claim 23, wherein the one or more processing units are configured to send the second configuration data on a frequency separate from the PRS resource during a last OFDM symbol of the PRS resource.

33. The network entity of claim 23, wherein the one or more processing units are configured to send the second configuration data in a Physical Downlink Shared Channel (PDSCH) at the end of the PRS resource or as embedded data at the end of the PRS resource.

34. A user equipment (UE) for processing secured Positioning Reference Signals (PRS) resources for positioning of the UE in a wireless communication network, comprising:
a transceiver;
a memory; and
one or more processing units communicatively coupled to the transceiver and the memory, wherein the one or more processing units are configured to:
receive, from a network entity via the transceiver, first configuration data indicative of a period of time during which at least a portion of a PRS resource is to be transmitted using one or more Orthogonal Frequency Division Multiplexing (OFDM) symbols, wherein:

the first configuration data is received prior to transmission of the portion of the PRS resource by a Transmission and Reception Point (TRP) of the wireless communication network; and the first configuration data excludes at least one transmission parameter value for generating a waveform for each of the one or more OFDM symbols;

buffer data from signals received by the TRP during the period of time;

receive, from a network entity via the transceiver, second configuration data indicative of the at least one transmission parameter value, wherein the second configuration data is received no earlier than the transmission of the portion of the PRS resource; and process the portion of the PRS resource using the at least one transmission parameter value on at least a portion of the buffered data to generate a waveform for each of the one or more OFDM symbols.

35. The UE of claim 34, wherein the second configuration data does not include information for generating a waveform for:
  any OFDM symbol of a subsequent portion of the PRS resource, or
  any subsequent PRS resource in a PRS resource set of the PRS resource.

36. The UE of claim 34, wherein the one or more OFDM symbols include a plurality of OFDM symbols, and the at least one transmission parameter value comprises a unique transmission parameter value for each of the plurality of OFDM symbols.

37. The UE of claim 34, wherein the one or more OFDM symbols are in the same OFDM slot or the same repetition of the PRS resource.

38. The UE of claim 34, wherein the at least one transmission parameter value comprises a value of:
  a scrambling ID,
  a frequency-domain parameter,
  a comb pattern,
  a OFDM symbol offset,
  a slot offset, or
  a combination thereof.

39. The UE of claim 34, wherein the second configuration data is provided in:
  a Downlink Control Information (DCI) message,
  a Media Access Control-Control Element (MAC-CE) message,
  an LTE Positioning Protocol (LPP) message,
  a Radio Resource Control (RRC) message,
  a group-common Physical Downlink Control Channel (PDCCH) message,
  a positioning System Information Block (posSIB), or
  a combination thereof.

40. The UE of claim 34, wherein the network entity comprises a location server or a serving TRP of the UE.

41. The UE of claim 34, wherein the second configuration data comprises a secure sequence generator, and wherein, to process the PRS resource, the one or more processing units are configured to, for each of the one or more OFDM symbols, use the secure sequence generator to generate the at least one transmission parameter value of the respective OFDM symbol.

42. The UE of claim 34, wherein the first configuration data includes an indication of a maximum time delay between the transmission of the at least the portion of the PRS resource and a time the second configuration data is received by the UE.

43. The UE of claim 34, wherein the one or more processing units are configured to receive the second configuration data on a frequency separate from the PRS resource during a last OFDM symbol of the PRS resource.

44. The UE of claim 34, wherein the one or more processing units are configured to receive the second configuration data in a Physical Downlink Shared Channel (PDSCH) at the end of the PRS resource or as embedded data at the end of the PRS resource.

* * * * *